US012102575B2

(12) United States Patent
Traxinger

(10) Patent No.: US 12,102,575 B2
(45) Date of Patent: Oct. 1, 2024

(54) WHEELCHAIR HAVING AN ADJUSTABLE BASE

(71) Applicant: Sunrise Medical (US) LLC, Fresno, CA (US)

(72) Inventor: Samuel D. Traxinger, Fresno, CA (US)

(73) Assignee: Sunrise Medical (US) LLC, Fresno, CA (US)

(*) Notice: Subject to any disclaimer, the term of this patent is extended or adjusted under 35 U.S.C. 154(b) by 0 days.

(21) Appl. No.: 17/526,820

(22) Filed: Nov. 15, 2021

(65) Prior Publication Data

US 2022/0071821 A1 Mar. 10, 2022

Related U.S. Application Data

(63) Continuation-in-part of application No. 16/755,392, filed as application No. PCT/US2018/055678 on Oct. 12, 2018, now Pat. No. 11,607,355.

(60) Provisional application No. 63/113,585, filed on Nov. 13, 2020, provisional application No. 62/571,313, filed on Oct. 12, 2017.

(51) Int. Cl.
*A61G 5/10* (2006.01)

(52) U.S. Cl.
CPC .................................. *A61G 5/1075* (2013.01)

(58) Field of Classification Search
CPC ...... A61G 5/1075; A61G 5/14; A61G 5/1056; A61G 5/107
See application file for complete search history.

(56) References Cited

U.S. PATENT DOCUMENTS

| | | | | |
|---|---|---|---|---|
| 5,669,620 A * | 9/1997 | Robbins | A61G 3/02 414/921 |
| 6,105,706 A * | 8/2000 | Cooper | B60N 2/24 297/344.11 |
| 10,500,112 B1 * | 12/2019 | Hanson | A61G 5/1056 |
| 10,828,213 B1 * | 11/2020 | Ludovici | A61G 5/1054 |
| 2004/0188979 A1 * | 9/2004 | Bernatsky | A61G 5/1075 280/304.1 |
| 2005/0116440 A1 * | 6/2005 | Bernatsky | A61G 5/1075 280/250.1 |
| 2009/0085324 A1 * | 4/2009 | Blauch | A47C 1/027 280/304.1 |

(Continued)

FOREIGN PATENT DOCUMENTS

| | | |
|---|---|---|
| EP | 0960613 A2 * | 12/1999 |
| KR | 20170109286 A * | 9/2017 |

*Primary Examiner* — James A Shriver, II
*Assistant Examiner* — Ian Bryce Shelton
(74) *Attorney, Agent, or Firm* — MacMillan, Sobanski & Todd, LLC

(57) ABSTRACT

A wheelchair comprises a base assembly and a tilt assembly detachably supported on the base assembly. The base assembly has a mounting point that receives the tilt assembly and a latch receiver that engages a latch assembly of the tilt assembly. The wheelchair further provides a fore and aft adjustment of a seat mounted to the tilt assembly and an angular adjustment of the seat relative to a rocker of the tilt. Each of the fore/aft seat adjustment and the seat angle adjustment relative to the rocker is independently adjustable. The rocker position of the tilt assembly relative to the base is unchanged when either the seat longitudinal position or angular position is adjusted.

18 Claims, 26 Drawing Sheets

(56) References Cited

U.S. PATENT DOCUMENTS

| | | | | |
|---|---|---|---|---|
| 2010/0156065 | A1* | 6/2010 | Cerreto | A61G 5/1075<br>280/281.1 |
| 2011/0276233 | A1* | 11/2011 | Lofstrand | A61G 5/1056<br>5/608 |
| 2014/0246841 | A1* | 9/2014 | Slagerman | A61G 5/107<br>280/220 |
| 2015/0137548 | A1* | 5/2015 | Purdue | A61G 5/1075<br>296/65.08 |
| 2015/0231002 | A1* | 8/2015 | Gierse | A61G 5/1075<br>297/344.17 |
| 2015/0231004 | A1* | 8/2015 | Dahlin | A61G 5/1075<br>280/304.1 |
| 2016/0101664 | A1* | 4/2016 | Richter | A61G 5/1081<br>701/49 |
| 2016/0143793 | A1* | 5/2016 | Holub | A61G 5/128<br>297/440.1 |
| 2017/0079861 | A1* | 3/2017 | Lau | A61G 5/061 |
| 2017/0273840 | A1* | 9/2017 | Melgarejo | A61G 5/1059 |
| 2019/0060144 | A1* | 2/2019 | St-Cyr | A61G 5/10 |

* cited by examiner

WHEELCHAIR HAVING AN ADJUSTABLE BASE

CROSS-REFERENCE TO RELATED APPLICATIONS

This application is a continuation in part patent application of U.S. patent application Ser. No. 16/755,392, filed Apr. 10, 2020. U.S. application Ser. No. 16/755,392 is the National Phase of International Application PCT/US2018/055678, filed Oct. 12, 2018 which designated the U.S. and that International Application was published in English on Apr. 18, 2019 as International Publication Number WO 2019/075374 A1. PCT/US2018/055678 claims the benefit of U.S. Provisional Application No. 62/571,313, filed Oct. 12, 2017. This application further claims the benefit of U.S. Provisional Application No. 63/113,585, filed on Nov. 13, 2020. Thus, the subject nonprovisional application claims priority to U.S. Provisional Application No. 62/571,313, filed Oct. 12, 2017. The disclosure of these applications are incorporated herein by reference in their entirety.

BACKGROUND OF THE INVENTION

This invention relates generally to wheelchairs and more particularly to a wheelchair having a tilt adjustable base.

Wheelchairs with tilting seats are typically used in highly dependent or geriatric care where the ability to reposition an occupant in various angular positions is beneficial to the occupant's health and daily routine. One type of wheelchair has a seat assembly supported on a base assembly. The base assembly, in turn, includes frame members that support a pair of rockers. The seat assembly is supported on the rockers which rotate relative to the frame members to tilt the seat assembly. The base assembly further has a support structure—e.g., suspension or other framing—for positioning drive wheels and caster wheels. The support structure is attached to the base assembly.

The wheelchair may be adjusted to accommodate different widths of seat assemblies. The frame members are adjustably connected to the rockers—i.e., each of the frame members has at least one adjustable connection with at least one of the rockers. To accommodate the different seat assembly widths, the width between the rockers is adjusted by disconnecting the frame members from the rockers. Each frame member is then reconnected to the rockers to set a width. However, adjusting the width of the rockers also changes the width between the wheels because the support structure for the wheels moves with the rockers and frame members. The widths of the rockers and wheels cannot be adjusted independently even if only one width adjustment is desired.

Traditional tilt-in-space wheelchairs permit a seated user's attitude relative to a reference plane, such as a horizontal or vertical plane, to be easily adjusted because the user's center of gravity (CG) is adjusted to be generally coincident with a radius of curvature of the rocker assembly. The ability to easily and accurately reposition the seat to align the user's CG and the rocker rotational center is limited to the structure of the seat frame adjustment relative to the rocker. These adjustments are normally made by moving telescoping seat frame tubes into the desired positions and securing the tubes with fasteners or resiliently actuated buttons and mating detents or apertures. These adjustments are made to individual seat components and rely on equal side-to-side adjustments to ensure proper fits. It would be desirable to provide a singular seat adjustment to reposition the user CG relative to the rocker center of rotation.

With traditional tilt-in-space wheelchairs the user angular adjustment is limited to movement of the rocker assembly relative to the base. Typically, tilt-in-space rockers are constructed as fixed units without adjustment capability of the seat mounting structure relative to the arcuate rocker structure. If a user would benefit from a more reclined position, shims or other support structures are installed between the upper seat mount of the rocker and the seat frame base. Thus, it would be desirable to provide the ability to simply and easily adjust the seat mounting structure of the rocker to provide added seat angular positioning without the addition of additional hardware or removal of the seat.

Further, traditional manual wheelchairs with tilt-in-space attitude adjustment mechanisms are fixed to rigid frame systems. The frame, seat, and tilting system are rigidly mounted and integrated with respect to each other which renders them more difficult to transport, particularly in a trunk or small vehicle. In some cases, certain components such as backrest, armrest and footrest of the wheelchair are foldable or removable in order to accommodate transporting or storing. The tilt-in-space rocker and frame assemblies are not intended to be easily separable. Thus, it would be desirable to provide an improved wheelchair with a tilt-in-space rocker assembly and seat that can be disassembled for easier transport, reassembled easily, and maintain a firm structural feel to the user when reassembled.

SUMMARY OF THE INVENTION

This invention relates to a wheelchair having an adjustable base. In particular, this invention relates to a wheelchair having a tilt assembly, pivotable around a center of gravity point, supported by a width and/or length adjustable base.

According to one embodiment, the wheelchair includes a base assembly and a tilt assembly supported on the base assembly. The base assembly has a wheelbase and a wheel track, each of which is independently adjustable. The configuration of the tilt assembly, including the width dimension between the rockers, can remain unchanged when either the wheelbase or wheel track is adjusted.

According to another embodiment, a wheelchair comprises a base assembly and a tilt assembly. The base assembly has first and second side frames with a spacing between the first and second side frames, first and second adjustable arm assemblies extending from the first side frame, and third and fourth adjustable arm assemblies extending from the second side frame. The side frame spacing is maintained when any of the first, second, third, or fourth arm assemblies is adjusted in a first or second direction, wherein the first and second directions are different. The tilt assembly is supported on the first and second side frames. The first and second side frames restrain movement of the tilt assembly in the first and second directions while allowing movement in a vertical direction.

According to another embodiment, a method of configuring a wheelchair comprises selecting the wheelchair, removing a tilt assembly from a base assembly of the wheelchair, and installing a new tilt assembly in the base assembly. The wheelchair has the base assembly with a wheelbase and a wheel track, wherein each of the wheelbase and wheel track are independently adjustable, and the tilt assembly supported on the base assembly. The wheelbase and wheel track are constant while the tilt assembly is removed from the base assembly and unchanged between the removed tilt assembly and the new tilt assembly.

According to yet another embodiment, a wheelchair comprises a base assembly having spaced-apart first and second side frames, the first and second side frames defining mounting points. A front cross member has mounting arms extending therefrom, the front mounting arms being adjustably supported by the first and second side frame mounting points. A rear cross member has mounting arms extending therefrom, the rear mounting arms being adjustably supported by the first and second side frame mounting points. Spaced-apart front caster arms support front caster wheels. The spaced-apart front caster arms are adjustably mounted to the front cross member to define a front wheel track width. The rear wheel support arms support rear drive wheels and are adjustably mounted to the rear cross member to define a rear wheel track width. The front and rear cross members are adjusted to define a wheelbase between the front caster wheels and the rear drive wheels. A tilt assembly defines a focal point of rotational movement and is adjustable to position a user center of gravity relative to the focal point and adjustment of at least one of the wheelbase or the wheel track width is independent of the tilt assembly.

The wheelchair may further include the front cross member as a tubular element and the spaced-apart front caster arms are telescopically received within the front cross member to define a front wheel track. Additionally, the rear cross member may be a tubular element and the rear wheel support arms are telescopically received within the rear cross member to define a rear wheel track. The front and rear mounting arms extending from the respective front and rear cross members may also be tubular elements and the first and second side frame mounting points configured to separately engage the front and rear mounting arms for telescopic adjustment to define the wheelbase.

In one particular aspect of the invention, the tilt assembly includes spaced apart rockers having arcuate surfaces that define the focal point and may be removable or adjustable to vary one of a seat width or the focal point independent of the adjustment of the wheelbase or wheel track width. In addition, the tilt assembly may include an actuator or a gas spring configured to permit selective rotation and locking of the rockers relative to the base assembly.

In yet another aspect of the invention, the tilt assembly may include spaced apart pivot brackets. The pivot brackets are vertically adjustable relative to the base assembly and pivotally support a seat pan such that vertical and pivotal adjustment of the seat pan relative to the base assembly defines the focal point. In addition, the tilt assembly may be removable or adjustable to vary one of a seat width or the focal point independent of the adjustment of the wheelbase or wheel track width. Similarly, the tilt assembly may include an actuator or a gas spring configured to permit selective rotation and vertical positioning of the pivot brackets and the seat pan relative to the base assembly.

The wheelchair may also be configured such that the rear wheels are attached to rear wheel mounts that are adjustable along the rear wheel support arms to further adjust the wheelbase.

According to yet another embodiment, the wheelchair is configured with a tilt assembly that is detachable from the base frame. The tilt assembly includes a rocker assembly that is supported by a roller mount for selective movement along the rockers. The roller mount includes a first attachment point and a latch assembly. The first attachment point of the roller mount engages a second attachment point supported on the base frame. The base frame includes a latch receiver that permits the latch assembly to engage the tilt assembly to the base or disengage the tilt assembly from the base. The wheelchair further includes a seat position adjustment to permit movement of the seat along the upper seat frame of the tilt assembly. In another aspect of the tilt-in-space wheelchair, the tilt assembly includes a seat angle adjustment between the rocker and the upper seat frame. The rocker is pivotally mounted to the upper seat frame at a distal end and the seat angle adjuster is pivotally mounted the rocker and a proximal end of the upper seat frame of the tilt assembly.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
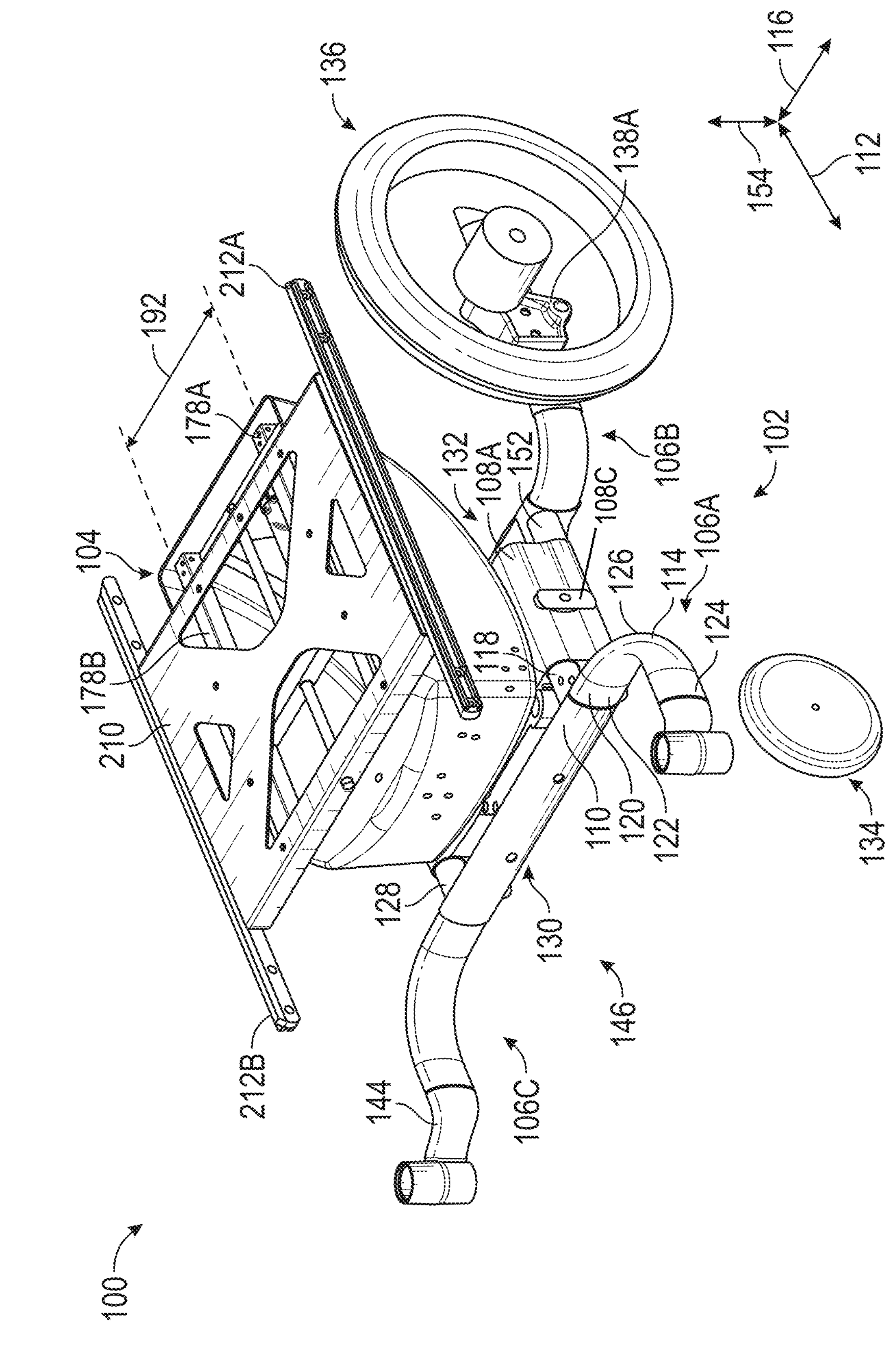
FIG. 1 is a perspective view of a first embodiment of a wheelchair according to the invention.

Referring now to drawings, there is illustrated in FIG. 1 a first embodiment of a wheelchair, indicated generally at 100, having a base assembly, indicated generally at 102, a tilt assembly, indicated generally at 104, and a seat assembly (not shown). The tilt assembly 104 is supported on the base assembly 102 and the seat assembly is in turn supported on the tilt assembly 104. Though show in an environment of a wheelchair, the base, tilt, and seat assemblies may be suitable for other personal mobility vehicles such as, for example, scooters, strollers, and the like. In addition, though illustrated in an environment of a manually propelled wheelchair, the base, tilt, and seat assemblies may also be suitable for powered wheelchairs such as front drive, rear drive and mid-wheel drive wheelchairs.

The base assembly 102 has first, second, third, and fourth arm assemblies, indicated generally at 106A, 106B, 106C, and 106D, respectively. Discussion of any one of the first, second, third, and fourth arm assemblies 106A, 106B, 106C, and 106D, respectively, also applies to the other of the first, second, third, and fourth arm assemblies 106A, 106B, 106C, and 106D, unless otherwise noted. The first and second arm assemblies 106A and 106B, respectively, extend from a first side frame 108A and the third and fourth arm assemblies 106C and 106D, respectively, extend from a second side frame 108B. Discussion of one of the first and second side frames 108A and 108B, respectively, also applies to the other of the first and second side frames 108A and 108B, respectively, unless otherwise noted. The first and third arm assemblies 106A and 106C cooperate to form a rolling front end of the wheelchair may also be referred to as front caster arm assemblies 106A and 106C. Likewise, second and fourth arm assemblies 106B and 106D may be referred to as rear wheel or drive wheel support arms 106B and 106D. Alternatively, the rear wheel support arms may be configured as rear caster arms, if desired.

The first arm assembly 106A has a first arm 110 adjustably attached to the first side frame 108A. As will be discussed, a position of the first arm 110 is adjustable—i.e., may be extended or retracted—in the first direction 112 relative to the first side frame 108A. As illustrated, the first arm 110 is a tube telescopically inserted in the first side frame 108A. Alternatively, the first arm 110 may be other than a tube, such as a stamping, solid arm member, or panel structure and be provided in any geometric cross section. The first arm 110 may further engage the first side frame 108A other than telescopically inserted, such as adjustably attached by way of fasteners. The first arm 110 extends from the first side frame 108A in the first direction 112. As illustrated, the first direction 112 is substantially parallel to a direction of travel for the wheelchair 100.

The first arm 110 is adjustably attached to the first side frame 108A. As non-limiting examples, the first arm 110 may be attached to the first side frame 108A by pins, bolts, a spring plunger, or other fasteners extending through corresponding holes in the first side frame 108A and the first arm 110, wherein adjustability is achieved by providing a plurality of holes in one, or both, of the first side frame 108A and first arm 110 in the first direction 112. To adjust the position of the first arm 110 relative to the first side frame 108A, the fasteners are removed, the first arm 110 moved in the first direction 112 relative to the first side frame 108A, and the fasteners then reinstalled to attach the first arm 110 to the first side frame 108A. Alternatively, the first side frame 108A and the first arm 110 may be attached together by other than fasteners or means requiring holes. As non-limiting examples, the first side frame 108A and the first arm 110 may be clamped together or attached by a hook and eye or other type of releasable catch or connection. The illustrated embodiment shows a toe clamp 108C, as will be explained below.

In turn, a second arm 114 is adjustably attached to the first arm 110. The second arm 114 extends in a second or width direction 116 that is substantially perpendicular to the first direction 112. The first and second directions 112 and 116, respectively, define a generally horizontal plane. The second arm 114 is adjustable—and may be extended or retracted—in the second direction 116 relative to the first arm 110 and first side frame 108A. As illustrated, the second arm 114 is a tube telescopically positioned relative to the first arm 110. For example, second arm 114 may be telescopically inserted in the first arm (as illustrated) or the first arm 110 may be telescopically inserted in the second arm 114. Alternatively, the second arm 114 may be other than a tube and/or other than telescopically positioned relative to the first arm 110.

The second arm 114 is adjustably attached to the first arm 110. As non-limiting examples, the second arm 114 may be attached to the first arm 110 by pins, bolts, a spring plunger, or other fasteners extending through corresponding holes in the first arm 110 and the second arm 114, wherein adjustability is achieved by providing a plurality of holes in one, or both, of the first arm 110 and second arm 114 in the second direction 116. To adjust the position of the second arm 114 relative to the first arm 110, the fasteners are removed, the second arm 114 moved in the second direction 116 relative to the first arm 110, and the fasteners reinstalled to attach the second arm 114 to the first arm 110. Alternatively, the first and second arms 110 and 114, respectively, may be attached together by other than fasteners or means requiring holes. As non-limiting examples, the first and second arms 110 and 114, respectively, may be clamped together or attached by a hook and eye or other type of releasable catch or connection.

As illustrated, the first arm 110 comprises first and second arm portions 118 and 120, respectively. The first arm portion 118 of the first arm 110 is adjustably attached to the first side frame 108A and extends in the first direction 112. The second arm portion 120 of the first arm 110 is substantially perpendicular to the first arm portion 118 and extends in the second direction 116.

As illustrated, the second arm 114 also comprises first and second arm portions 122 and 124, respectively. The first arm portion 122 of the second arm 114 is telescopically attached to or received within the second arm portion 120 of the first arm 110. As such, the first arm portion 122 of the second arm 114 extends in the same direction as the second arm portion 120 of the first arm 110—i.e., the second direction 116. The second arm portion 124 of the second arm 114 is connected to the first arm portion 122 of the second arm 114 by a curved section 126, which may also be configured as a generally L-shaped elbow portion. Accordingly, the second arm portion 124 of the second arm 114 is generally perpendicular to the first arm portion 122 of the second arm 114. Second arm portion terminates in a caster mount that supports the caster wheel 134 for swiveling rotation to permit turning of the wheelchair.

Alternatively, as a non-limiting example, the first arm assembly 106A may be a single arm that extends in both the first and second directions 112 and 116, respectively. As a non-limiting example, the single arm may extend in the horizontal plane away from the base assembly 102 and between the first and second directions 112 and 116, respectively. Alternatively, as a non-limiting example, the first arm assembly 106A may comprise arms additional to the first and second arms 110 and 114, respectively.

The first arm 110 of the first arm assembly 106A is connected or otherwise continuous with a first arm 128 of the third arm assembly 106C. As a result, the first arm 110 of the first arm assembly 106A and the first arm 128 of the third arm assembly 106C form a front cross member, indicated generally at 130. As shown in the figures, the first and second arms 110 and 128 are a single element forming the cross member 130. Alternatively, as described above, the first and second arms 110 and 128 may be separate elements. As a result, the first and third arm assemblies 106A and 106C, respectively, move together in the first direction 112. Similarly, first arms of the second and fourth arm assemblies 106B and 106D, respectively, are continuous and form a rear cross member, indicated generally at 132. As a result, the second and fourth arm assemblies 106B and 106D, respectively, also move together in the first direction 112. Together, the front and rear cross members 130 and 132, respectively, are supported by the first and second side frames 108A and 108B, respectively.

Attached to the second arm 114 is a front wheel assembly, indicated generally at 134, also defined as a front caster assembly. Preferably, each of the front wheel assemblies 134 (one each on the first and second arm assemblies 106A and 106C, respectively) is a caster assembly, known in the art. Attached to each of the second and fourth arm assemblies 106B and 106D, respectively, is a rear wheel, indicated generally at 136. Preferably, each of the rear wheels 136 is a drive wheel for propelling the wheelchair 100. As illustrated, the rear wheels 136 are drive wheels and the wheelchair may be propelled by an attendant. Alternatively, the rear wheels 136 may be self-propelled by an occupant of the wheelchair 100. Alternatively, the rear wheels 136 may be other than self-propelled. For example, the rear wheels 136 may be configured to be driven by a power drive unit such as an electric motor. The front wheel assemblies 134 and the rear wheels 136 together support the wheelchair 100 on a supporting surface such as a floor of a building, sidewalk, or roadway.

The rear wheel 136 for the second arm assembly 106B is rotationally attached to a first wheel attachment member 138A, which is adjustably attached to the second arm assembly 106B. Similarly, the rear wheel 136 for the fourth arm assembly 106D is rotationally attached to a second wheel attachment member 138B, which is adjustably attached to the fourth arm assembly 106D. Each of the rear wheels 136 are attached to first and second wheel attachment members 138A and 138B, respectively, such that the rear wheels 136 may rotate relative to the personal mobility device 100. Discussion of one of the first and second wheel attachment members 138A and 138B, respectively, also applies to the other of the first and second wheel attachment members 138A and 138B, respectively, unless otherwise noted.

The first wheel attachment member 138A is adjustably attached to the second arm assembly 106B such that a position of the first wheel attachment member 138A on the second arm assembly 106B may be adjusted in the second direction 116. As non-limiting examples, the first wheel attachment member 138A may be attached to the second arm assembly 106B by pins, bolts, a spring plunger, or other fasteners extending through corresponding holes in the second arm assembly 106B and the first wheel attachment member 138A, wherein adjustability is achieved by providing a plurality of holes in one, or both, of the second arm assembly 106B and first wheel attachment member 138A. Alternatively, the first wheel attachment member 138A may be attached to the second arm assembly 106B by other than fasteners or means requiring holes. As non-limiting examples, the first wheel attachment member 138A and second arm assembly 106B may be clamped together or attached by a hook and eye or other type of releasable catch or connection.

Figure 4:
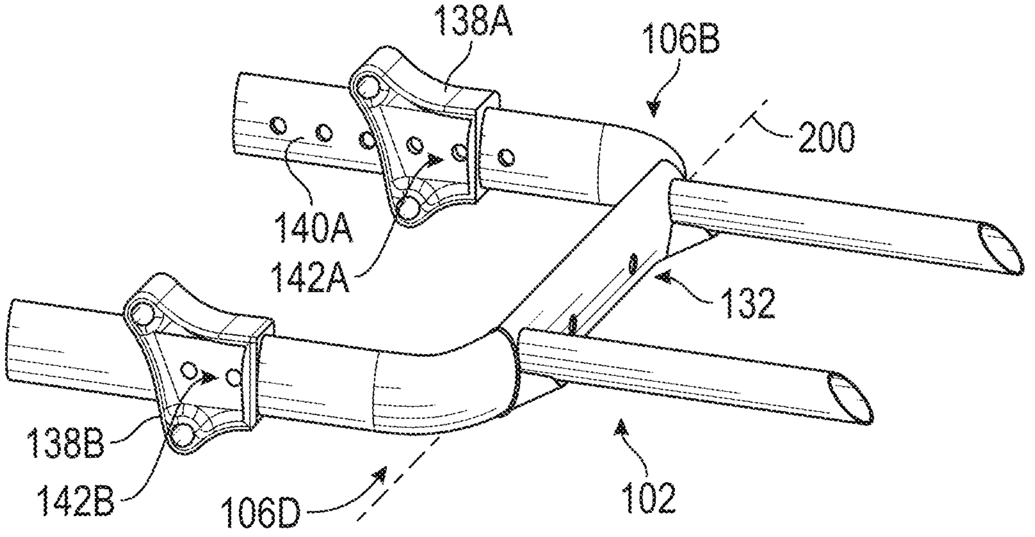
FIG. 4 is a perspective view of arm assemblies of the wheelchair of FIG. 1.
Figure 5:
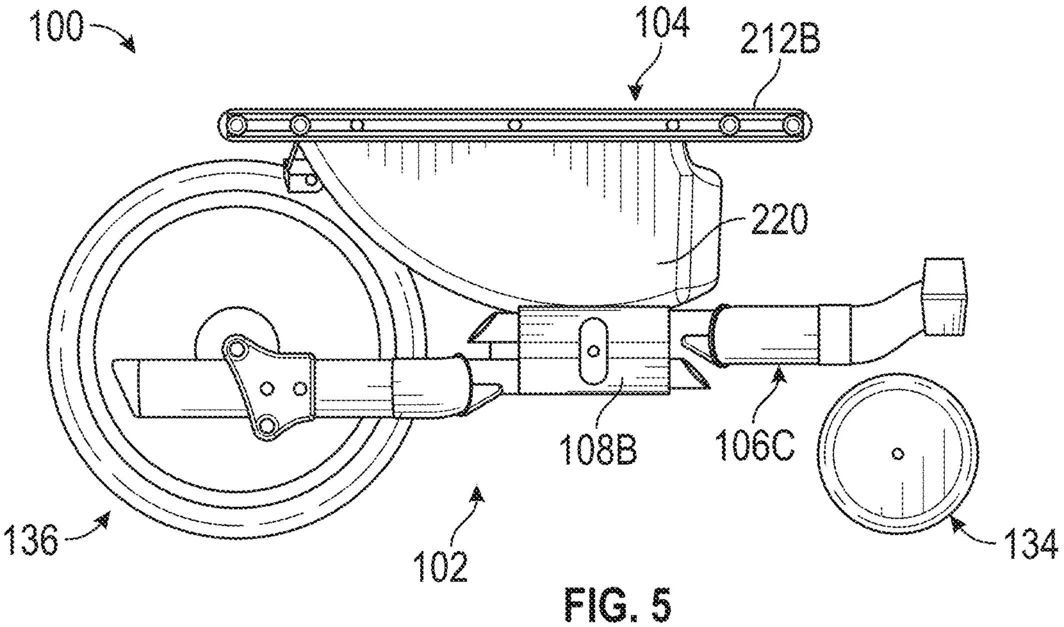
FIG. 5 is a side elevation view of the wheelchair of FIG. 1.
Figure 6:
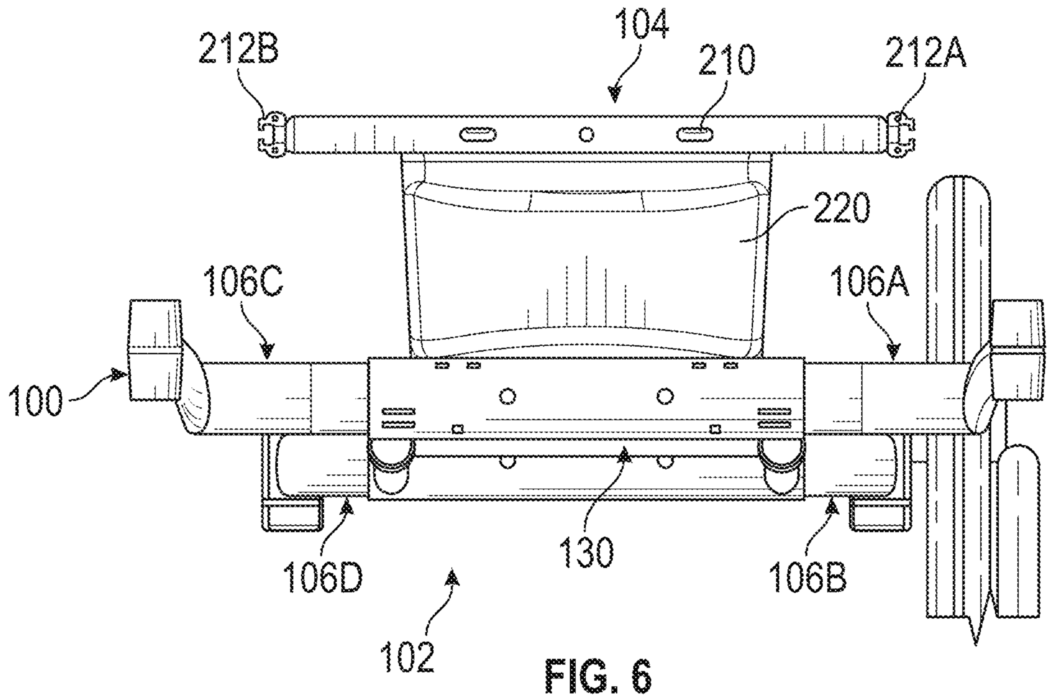
FIG. 6 is a front elevation view of the wheelchair of FIG. 1.
Figure 7:
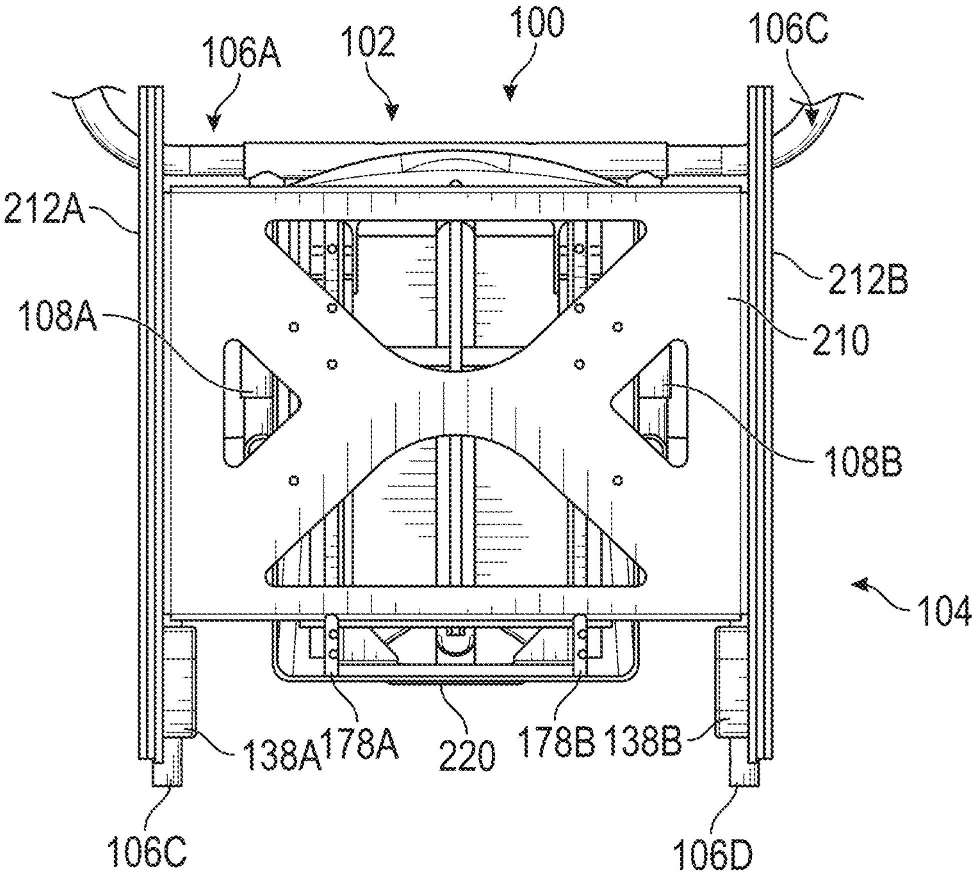
FIG. 7 is a top elevation view of the wheelchair of FIG. 1.

As best shown in FIG. 4, first holes, indicated generally at 140A, are in the second arm assembly 106B and second holes, indicated generally at 142A, are in the first wheel attachment member 138A. The first holes 140A and 140B are not on exterior or outward facing sides of the second and fourth arm assemblies 106B and 106D, respectively—i.e., the sides of the second and fourth arm assemblies 106B and 106D, respectively, facing the rear wheel 136.

Together, the first and third arm assemblies 106A and 106C, respectively, form a front C-shape in the horizontal plane. The first arm 110 of the first arm assembly 106A, the first arm 128 of the third arm assembly 106C, the second arm 114 of the first arm assembly 106A, and a second arm 144 of the third arm assembly 106C form the front C-shape. A similar rear C-shape is formed in the horizontal plane by the second and fourth arm assemblies 106B and 106D, respectively.

A clear space, indicated generally at 146, is defined within the front C-shape. The clear space 146 is at a front of the wheelchair 100. The clear space 146 may be used for foot propellers, such is possible with a knee-pivot adaption. Alternatively, the clear space 146 may be used to mount a center mount style footrest.

The first side frame 108A has first and second cavities 148 and 150, respectively, extending in the first direction 112. The first arm 110 of the first arm assembly 106A extends into the first cavity 148. The first cavity 148 is formed complimentary to the first arm 110 to receive the first arm 110.

Similarly, a first arm 152 of the second arm assembly 106B extends into the second cavity 150 and the second cavity 150 is formed complimentary to the first arm 152 to receive the first arm 152. Each of the first and second cavities 148 and 150, respectively, extends through the first side frame 108A—i.e., the first arm 110 and the first arm 152 may enter, pass through, and exit the first side frame 108A. Alternatively, the first and second cavities 148 and 150, respectively, may only extend into, and not through, the first side frame 108A—the first arm 110 and the first arm 152 may enter and pass through, but not exit, the first side frame 108A.

Figure 2:
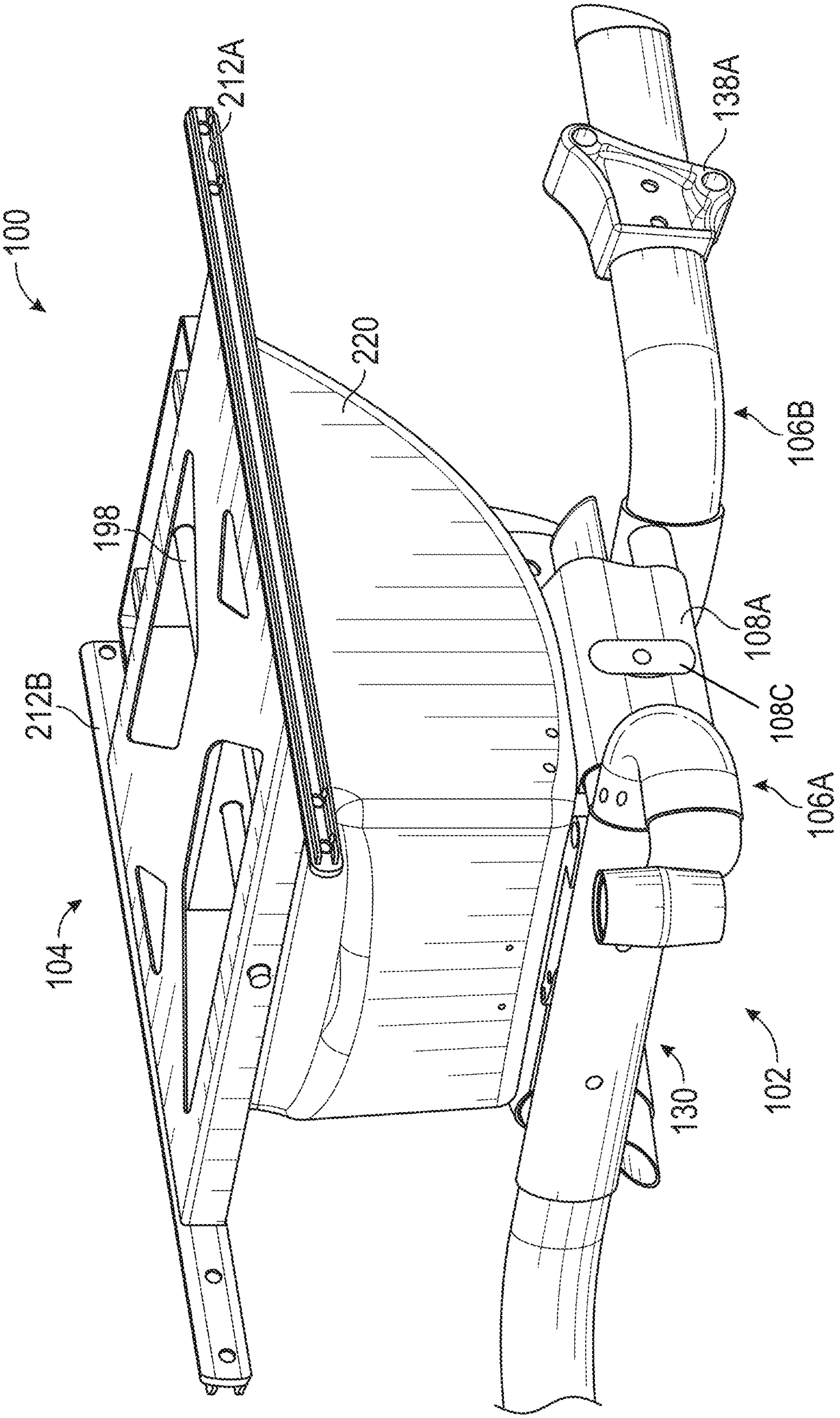
FIG. 2 is an enlarged, perspective view of a tilt assembly portion of the wheelchair of FIG. 1.
Figure 10:
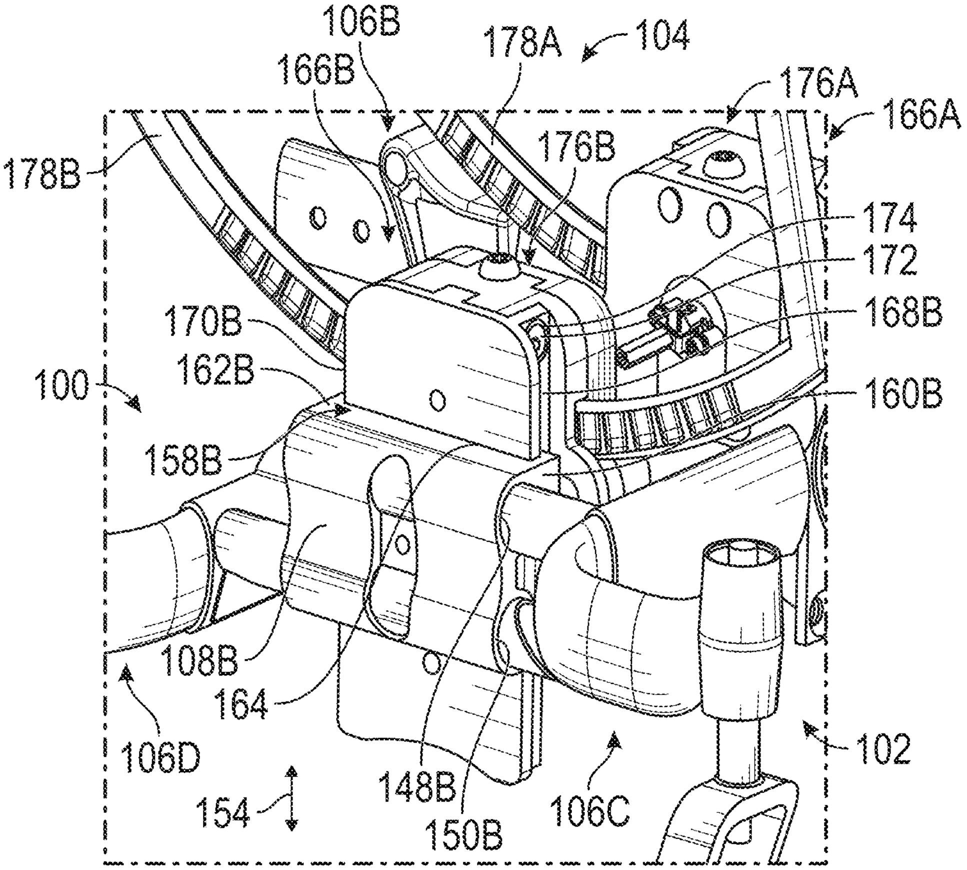
FIG. 10 is an enlarged perspective view of the wheelchair of FIG. 1.

The first arm 110 is adjustably attached to the first cavity 148. As non-limiting examples, the first arm 110 may be attached to the first cavity 148 by pins, bolts, a spring plunger, or other fasteners extending through corresponding holes in the first arm 110 and the first cavity 148, wherein adjustability is achieved by providing a plurality of holes in one, or both, of the first arm 110 and the first cavity 148. Alternatively, the first arm 110 may be attached in the first cavity 148 by other than fasteners or means requiring holes. As non-limiting examples, the first arm 110 may be clamped in the first cavity 148 or attached by a hook and eye or other type of releasable catch or connection. As illustrated in FIGS. 1 and 2, the first side frame 108A includes a clamping mechanism 108C, in the form of a toe clamp, that has a fastening element (such as a threaded rod, pin-lock stem, or bolt) extending between first arms 118 and 152. The toe clamp 108C contacts exposed portions of the first arms 118 and 152 through an aperture in the first side frame 108A, as shown in FIG. 10. Second side frame 108B may be similarly configured.

Similarly, the first arm 152 is adjustably attached in the second cavity 150. As non-limiting examples, the first arm 152 may be attached to the second cavity 150 by pins, bolts, a spring plunger, or other fasteners extending through corresponding holes in the first arm 152 and the second cavity 150, wherein adjustability is achieved by providing a plurality of holes in one, or both, of the first arm 152 and the second cavity 150. Alternatively, the first arm 152 may be attached in the second cavity 150 by other than fasteners or means requiring holes. As non-limiting examples, the first arm 152 may be clamped in the second cavity 150 or attached by a hook and eye or other type of releasable catch or connection.

The first and second cavities 148 and 150, respectively, allow positions of the first and second arm assemblies 106A and 106B, respectively, to be adjusted in the first direction 112 while restraining movement in a vertical direction 154 perpendicular to the horizontal plane. Furthermore, the adjustable attachments between the first arm 110 and the first cavity 148 and between the first arm 152 and the second cavity 150 allow a wheelbase 156 of the wheelchair 100 to be adjusted. As illustrated, both the first arm 110 is adjustable in the first cavity 148 and the first arm 152 is adjustable in the second cavity 150. Alternatively, only one of the first arm 110 in the first cavity 148 or the first arm 152 in the second cavity 150 may be adjustable with the other normally fixed in position.

As illustrated, the first and second cavities 148 and 150, respectively, are parallel and extend in the first direction 116 in the horizontal plane. Furthermore, the second cavity 150 is positioned above the first cavity 148 in a vertical plane that is perpendicular to the horizontal plane. Alternatively, the first and second cavities may be other than parallel, extending in the first direction 112, extending in the horizontal plane, or in the vertical plane. As a non-limiting example, the first and second cavities 148 and 150, respectively, may extend at angles between the first and second direction 112 and 116, respectively, or at angles with the horizontal plane. As a non-limiting example, the first and second cavities may both be in the horizontal plane or otherwise spatially arranged relative to each other.

The first side frame 108A further has an adapter portion, indicated generally at 158. As will be discussed, the adapter portion 158 adjustably attaches the tilt assembly 104 to the first side frame 108A. The adapter portion 158 allows movement or other adjustment of the tilt assembly 104 in the vertical direction 154 relative to the base assembly 102, while limiting movement of the adapter portion 158 relative to the base assembly 102 in other directions. The first side frame 108A has first and second channels 160 and 162, respectively, extending in the vertical direction 154. As illustrated, the first and second channels 160 and 162, respectively, have a U-shape profile extending in the vertical direction 154. Alternatively, one or both of the first and second channels 160 and 162, respectively, may have other than a U-shape profile. The first and second channels 160 and 162, respectively, are separated by a planar middle portion 164.

Generally, the tilt assembly 104 moves the seat assembly along a curve having a focal point and is also known as a tilt-in-space adjustment system. The tilt assembly 104 adjusts the seat assembly to achieve a desired position for a center of gravity of the occupant relative to the focal point of the curve defined by the support structure, such as rockers or a knee pivot structure, as will be explained below. The seat assembly may be as disclosed in U.S. Pat. No. 8,474,848 to Bernatsky et al., the disclosure of which is hereby incorporated by reference in entirety herein.

The tilt assembly has first and second slide plate assemblies, indicated generally at 166A and 166B, respectively. Discussion of one of the first and second slide plate assemblies 166A and 166B, respectively, also applies to the other of the first and second slide plate assemblies 166A and 166B, respectively, unless otherwise noted.

The second slide plate assembly 166B has first and second tabs 168B and 170B, respectively, extending in the vertical direction 154. The first tab 168B is shaped complementary to the first channel 160B and the second tab 170B is shaped complementary to the second channel 162B. As such, with the first tab 168B in the first channel 160B and the second tab 170B in the second channel 162B, the second slide plate assembly 166B is adjustable or otherwise moveable in the vertical direction 154 relative to the second side frame 108B while being restrained in other direction.

After adjustment in the vertical direction 154, the second slide plate assembly 166B is secured to the second side frame 108B by fasteners 172. The fasteners 172 are inserted through holes 174 in the second side frame 108B and secured to the second slide plate assembly 166B. As non-limiting examples, the fasteners 172 may be screws or bolts. Alternatively, the second slide plate assembly 166B may be moved in the vertical direction 154 by a motorized lift mechanism, in which case the motorized lift mechanism provides braking for the second slide plate assembly 166B and the fasteners 172 may be omitted. As a non-limiting example, the motorized lift mechanism may be an electric motor driving a linear actuator.

Attached to the first slide plate assembly 166A is a first roller assembly, indicated generally at 176A. Similarly, attached to the second slide plate assembly 166B is a second roller assembly, indicated generally at 176B. Discussion of one of the first and second roller assemblies 176A and 176B, respectively, also applies to the other of the first and second roller assemblies 176A and 176B, respectively, unless otherwise noted. The first roller assembly 176A supports a first rocker 178A and the second roller assembly 176B supports a second rocker 178B. Both the first and second rockers 178A and 178B, respectively, extend in the first direction 112. Discussion of one of the first and second rockers 178A and 178B, respectively, also applies to the other of the first and second rockers 178A and 178B, respectively, unless otherwise noted.

The second rocker 178B has an arcuate portion 180B that extends through the second roller assembly 176B. Within the second roller assembly 176B, the arcuate portion 180B is supported by a plurality of rollers, indicated generally at 182B. As illustrated, the rollers 182B comprise four rollers, two on each side of the arcuate portion 180B. Alternatively, a quantity or position of the rollers 182B may be other than as illustrated. The arcuate portion 180B rolls on the rollers 182B as the second rocker 178B is adjusted, rotated, or otherwise moved in the first direction 112.

The second rocker 178B has a plurality of indentations, indicated generally at 184B. The second roller assembly 176B further has a locking assembly, indicated generally at 186B, that includes a plunger 188B which selectively engages with the indentations 184B. When the plunger 188B engages one of the indentations, the second rocker 178B is locked in position relative to the second roller assembly 176B. This places the seat assembly at a desired angle relative to the base assembly 102.

In operation, when the plunger 188B is withdrawn from the indentations, the second rocker 178B is free to roll on the rollers 182B and move relative to the second roller assembly 176B—i.e., rotate. This allows the seat assembly to be adjusted to the desired angle relative to the base assembly 102. Once at the desired angle, the plunger 188B is reengaged to lock the second rocker 178B in position.

As illustrated, the locking assembly 186B may be manually actuated, by a cable 190B extending to a hand control on the wheelchair 100, to withdraw the plunger 188B from the indentations 184B. Springs may then reinsert the plunger 188B into the indentations 184B when the cable 190B is released. Alternatively, the locking assembly 186B may be power actuated—e.g., by an electric motor or drive—to withdraw and/or reinsert the plunger 188B.

The first and second rockers 178A and 178B, respectively, are readily removed from and installed in the first and second roller assemblies 176A and 176B, respectively. Different sized pairs of the first and second rockers 178A and 178B, respectively, may be used for different sizes of the seat assembly. As a non-limiting example, the tilt assembly 104 may utilize three or four different, interchangeable sizes of the first and second rockers 178A and 178B, respectively. As a non-limiting example, first and second rockers 178A and 178B, respectively, that are shorter in the first direction may be used with a smaller seat assembly and first and second rockers 178A and 178B, respectively, that are longer in the first direction may be used with a larger seat assembly. When the first and second rockers 178A and 178B, respectively, are interchanged, a rocker spacing 192 between the first and second rockers 178A and 178B, respectively, may remain constant for any of the first and second rockers 178A and 178B, respectively, installed in the first and second roller assemblies 176A and 176B, respectively.

The rocker spacing 192 being kept constant also results in a side frame spacing 194 between the first and second side frames 108A and 108B, respectively, being maintained at a constant distance apart because the first and second rockers 178A and 178B, respectively, are fixed in the second direction 116 relative to the first and second side frames 108A and 108B, respectively.

Matching a rocker length 196 of the first and second rockers 178A and 178B, respectively, to the seat assembly optimizes an envelope of the wheelchair 100 and avoids the first and second rockers 178A and 178B, respectively, extending beyond the rear of the wheelchair 100. Furthermore, when shorter first and second rockers 178A and 178B, respectively, are used, there is a corresponding weight reduction for the first and second rockers 178A and 178B, respectively.

The rear C-shape allows the rear wheels 136 to be placed in a self propel position, where an occupant can reach the drive wheels, for different rocker lengths 196 of the first and second rockers 178A and 178B, respectively. The second and fourth arm assemblies 106B and 106D, respectively, may be adjusted or moved in the first direction 112 towards the first and third arm assemblies 106A and 106C, respectively, to place the rear wheels 136 in the self propel position. Alternatively, the second and fourth arm assemblies 106B and 106D, respectively, may rotate about an axis 200 to place the rear wheels 136 in the self propel position.

Figure 11:
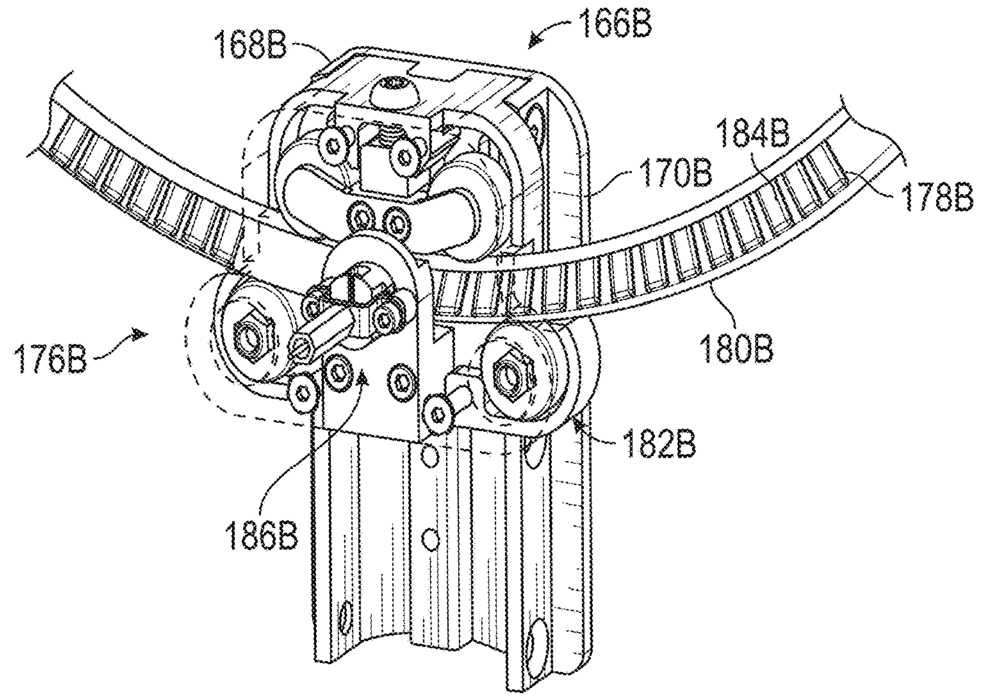
FIG. 11 is a partially transparent enlarged partial perspective view of a roller assembly of FIG. 10.
Figure 12:
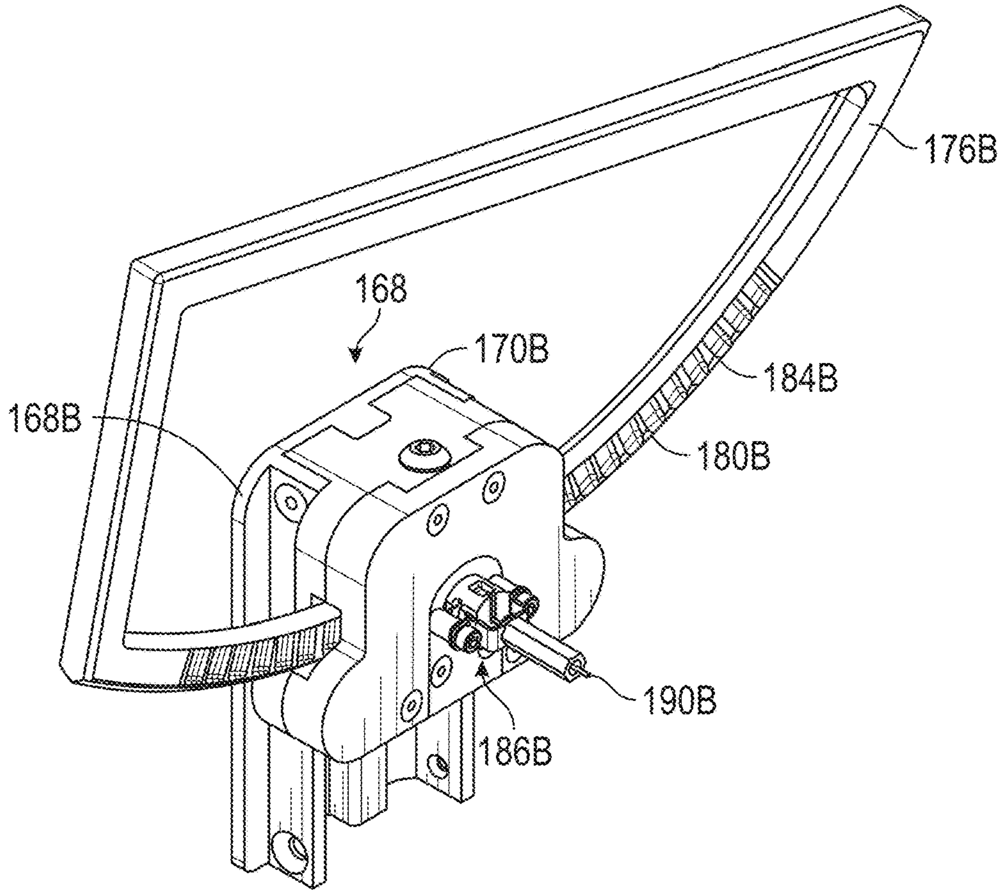
FIG. 12 is a perspective view of the roller assembly and a rocker of FIG. 10.
Figure 13:
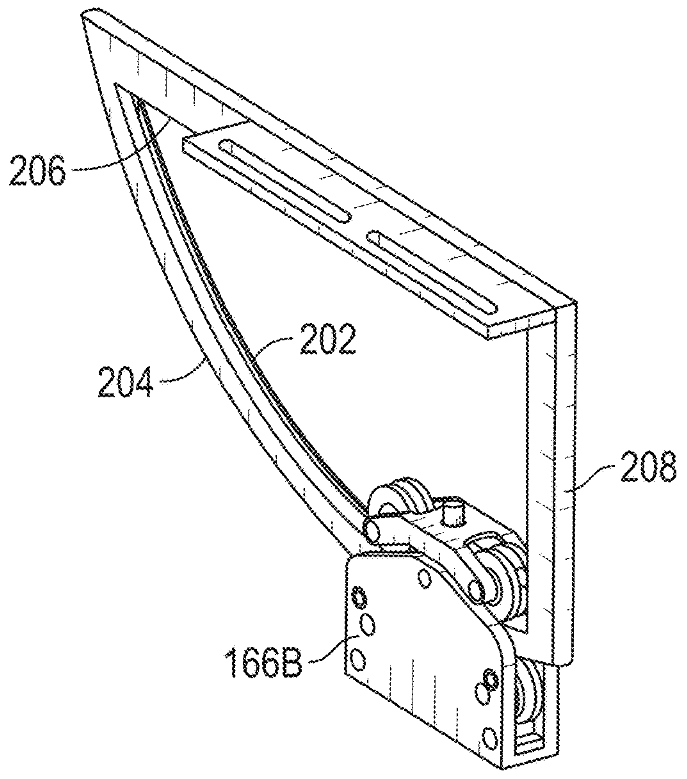
FIG. 13 is a perspective view of the rocker of the wheelchair of FIG. 1.
Figure 14:
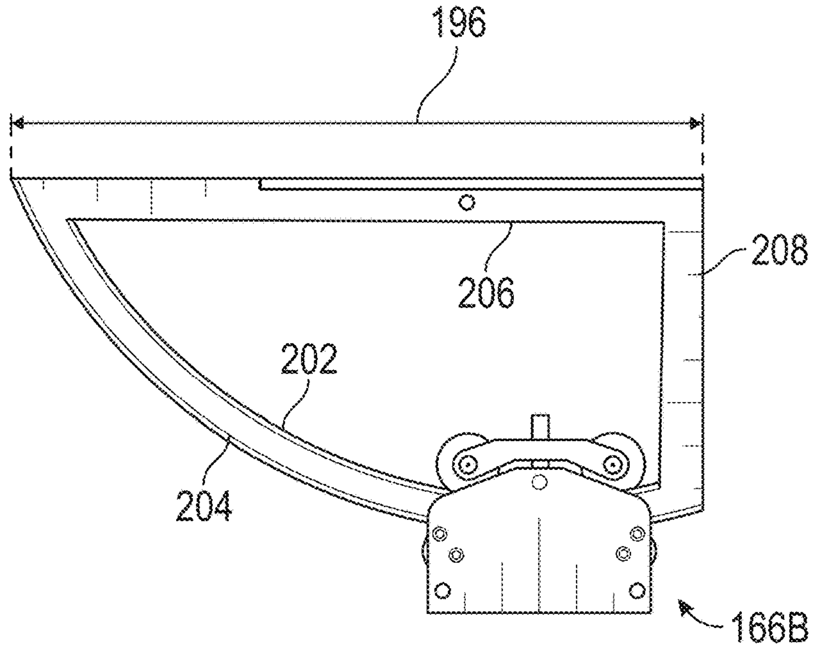
FIG. 14 is an elevation view of the rocker of FIG. 13.
Figure 15:
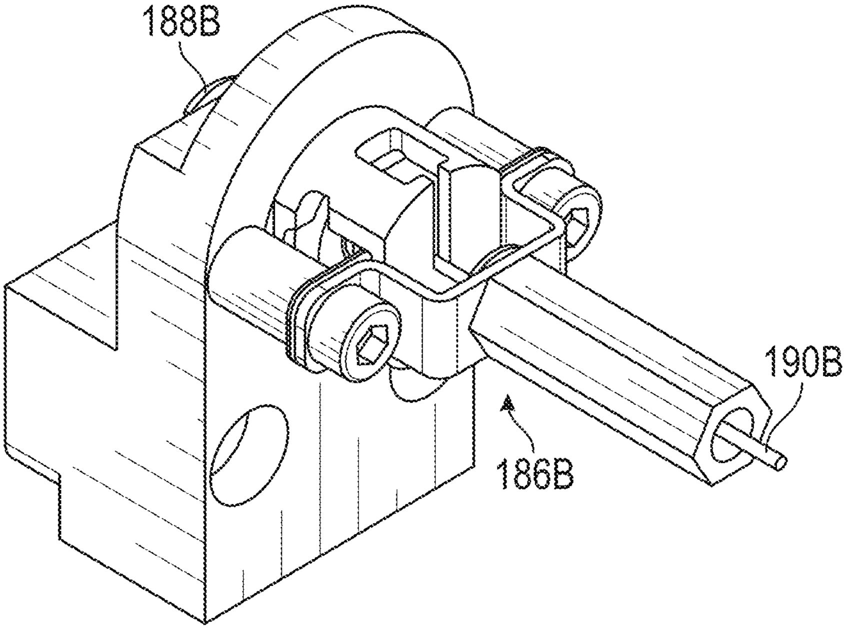
FIG. 15 is an elevation view of a locking assembly of the roller assembly of FIG. 11.

The first and second rockers 178A and 178B, respectively, have inner and outer track surfaces 202 and 204, respectively, that roll on the lower rollers 182 of each of the first and second roller assemblies 176A and 176B, respectively. Furthermore, the first and second rockers 178A and 178B, respectively, have inner and outer surfaces 206 and 208, respectively, that contact upper rollers, similar to lower rollers as shown in FIG. 11. The first and second rockers 178A and 178B, respectively, may be formed by any suitable, standard process. As a non-limiting example, the first and second rockers 178A and 178B, respectively, may be formed by forging, rolling, bending, or stamping and assembling two half sections into a rocker.

Attached to the first and second rockers 178A and 178B, respectively, for movement with the first and second rockers 178A and 178B, respectively, is a seat pan 210. In turn, the seat assembly is attached to the seat pan 210 for movement with the seat pan 210. Furthermore, the seat pan 210 is attached to the first and second rockers 178A and 178B, respectively, such that the seat pan 210 may be adjusted or otherwise moved on first and second tracks or rails 212A and 212B, respectively, in the first direction 112.

Figure 3:
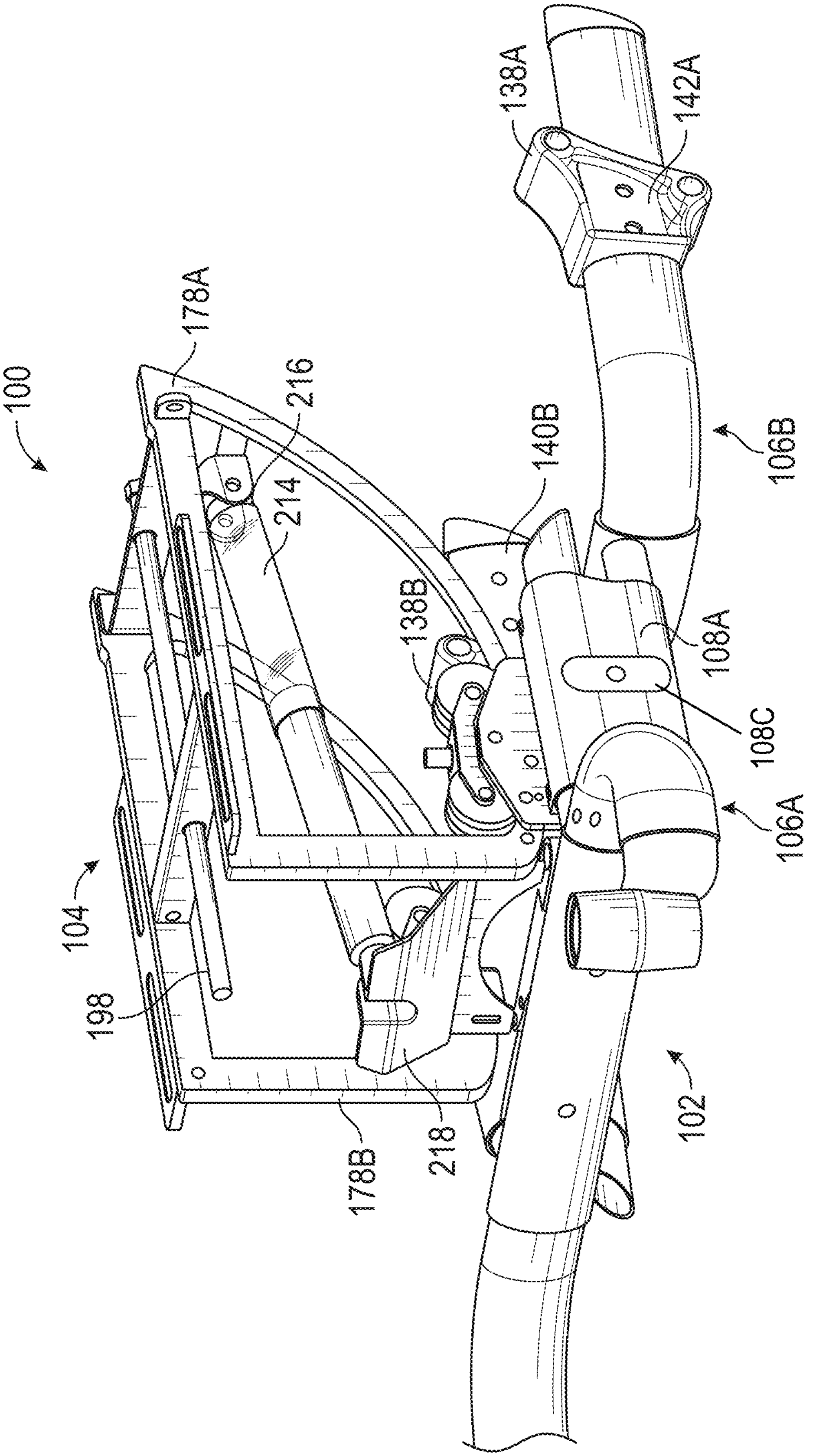
FIG. 3 is a perspective view of the wheelchair tilt assembly of FIG. 2 with a shroud and a seat pan removed.

As shown in FIG. 3, an actuator, illustrated as a locking gas spring assembly 214, connects a rocker connection or rocker plate 216 and a base connection or base plate 218. The rocker connection 216 spans between, and attaches to, the first and second rockers 178A and 178B, respectively. The base connection 218 is attached to the base assembly 102. The gas spring 214 acts between the rocker plate 216 and the base plate 218 to permit selective rotation and locking of the rockers, and also the seat, relative to the base assembly 102.

Preferably, the tilt assembly 104 is contained within a shroud 220.

As discussed, the first, second, third, and fourth arm assemblies 106A, 106B, 106C, and 106D, respectively, may be adjusted to change the wheel base of the wheelchair 100 in the first direction 112. Furthermore, the first, second, third, and fourth arm assemblies 106A, 106B, 106C, and 106D, respectively, may also be adjusted to change a front or rear wheel track 222A or 222B, respectively, of the wheelchair 100 in the second direction 116. The wheelbase 156 and front and rear wheel tracks 222A and 222B, respectively, may be adjusted independently of each other.

Figure 8:
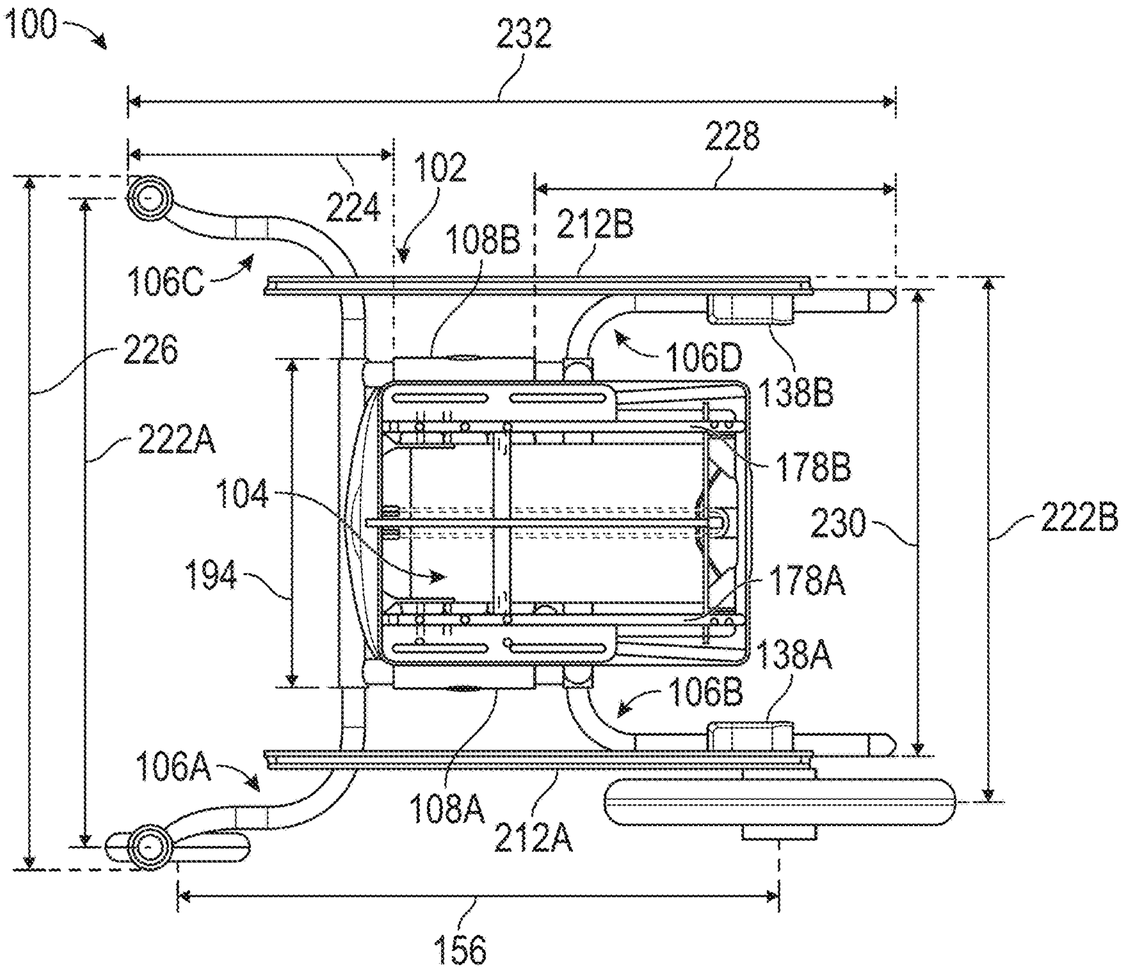
FIG. 8 is the elevation view of FIG. 7 with the seat pan removed.
Figure 9:
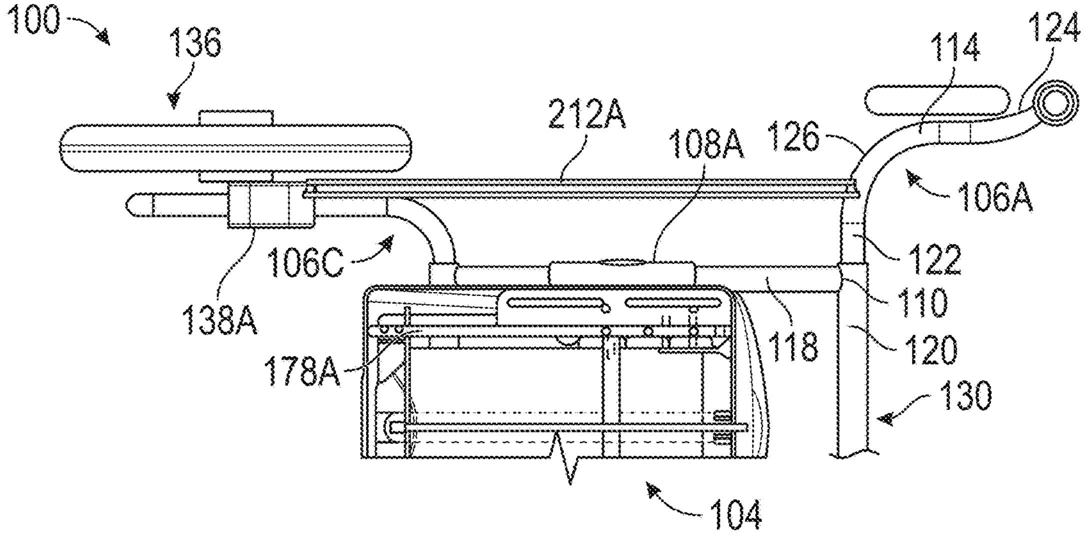
FIG. 9 is an enlarged, top elevation view of the wheelchair of FIG. 1.

Each of the first, second, third, and fourth arm assemblies 106A, 106B, 106C, and 106D, respectively, may be independently adjusted. As best shown in FIG. 8, a front length 224 from the first and second side frames 108A and 108B, respectively, a front width 226, a rear length 228 from the first and second side frames 108A and 108B, respectively, a rear width 230, and an overall length 232 are each adjustable via the first, second, third, and fourth assemblies 106A, 106B, 106C, and 106D, respectively, individually and in combination. Thus, the base assembly 102 may be sized for the seat assembly.

As the first, second, third, and fourth arm assemblies 106A, 106B, 106C, and 106D, respectively, are adjusted, the tilt assembly 104 is unchanged—i.e., the first, second, third, and fourth arm assemblies 106A, 106B, 106C, and 106D, respectively, are adjusted independently of the tilt assembly 104. Similarly, when the tilt assembly 104 is adjusted, the first, second, third, and fourth arm assemblies 106A, 106B, 106C, and 106D, respectively, are unchanged—i.e., the tilt assembly 104 is adjusted independently of the first, second, third, and fourth arm assemblies 106A, 106B, 106C, and 106D, respectively. For example, the tilt assembly 104 may be adjusted by interchanging the first and second rockers 178A and 178B, respectively.

Alternatively, the entire tilt assembly 104 may be removed from the base assembly 102 (the first slide plate assembly 166A removed from the first side frame 108A and the second slide plate assembly 166B removed from the second side frame 108B) and replaced with a new tilt assembly. When the entire tilt assembly 104 is removed from the base assembly 102, dimensions of the base assembly 102 may remain unchanged or constant, though such is not required. Similarly, dimensions of the base assembly 102 may be unchanged or constant between the tilt assembly 104 and the new tilt assembly being installed on the base assembly 102.

Dimensions of the base assembly 102—e.g., wheelbase 156 or front or rear wheel tracks 222A or 222B, respectively—may be adjusted independently of any adjustment of the tilt assembly 104—e.g., changing of the first and second rockers 178A and 178B—and vice versa. As a result, a center of gravity for the seat assembly may readily and easily adjusted (via center of gravity adjustor 198) with the occupant sitting in the seat assembly.

Figure 16A:
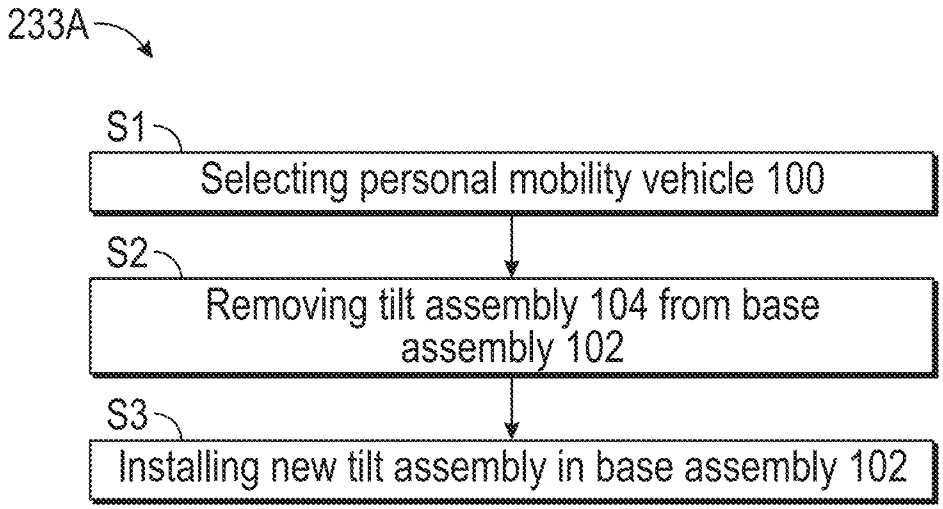
FIG. 16A is a flowchart of a method of reconfiguring a wheelchair with a tilt assembly.

As shown in FIG. 16A, a flowchart 233A illustrates a method for configuring the wheelchair 100. In a step S1, the wheelchair 100, having the base assembly 102 and tilt assembly 104, is selected. In a step S2, the tilt assembly 104 is removed from the base assembly 102. In a step S3, a new tilt assembly is installed in the base assembly 102. As discussed, the wheelbase 156 and wheel track 222 are constant or unchanged while the tilt assembly 104 is removed from the base assembly 102 and also unchanged between the tilt assembly 104 and the new tilt assembly.

Figure 16B:
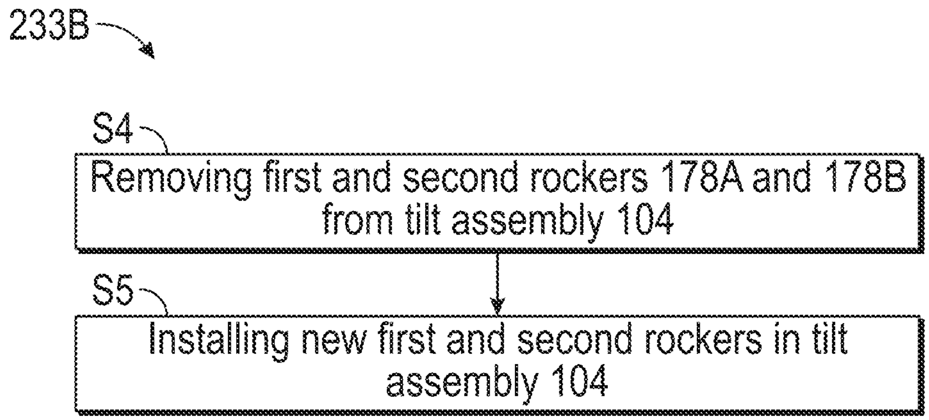
FIG. 16B is a flowchart of a method of reconfiguring a tilt assembly of a wheelchair.

As shown in FIG. 16B, a flowchart 233B illustrates producing the new tilt assembly of FIG. 16A by interchanging the first and second rockers 178A and 178B, respectively. In a step S4, the first and second rockers 178A and 178B, respectively, are removed from the tilt assembly 104. In a step S5, new first and second rockers are installed in the tilt assembly 104. A new rocker spacing between the new first and second rockers is equal to the rocker spacing 192 between the first and second rockers 178A and 178B, respectively and a new rocker length of the new first and second rockers is different than the rocker length 196 of the first and second rockers 178A and 178B, respectively. As a result, the tilt assembly 104 with the new first and second rockers becomes the new tilt assembly of step S3 of FIG. 16A.

Figure 17:
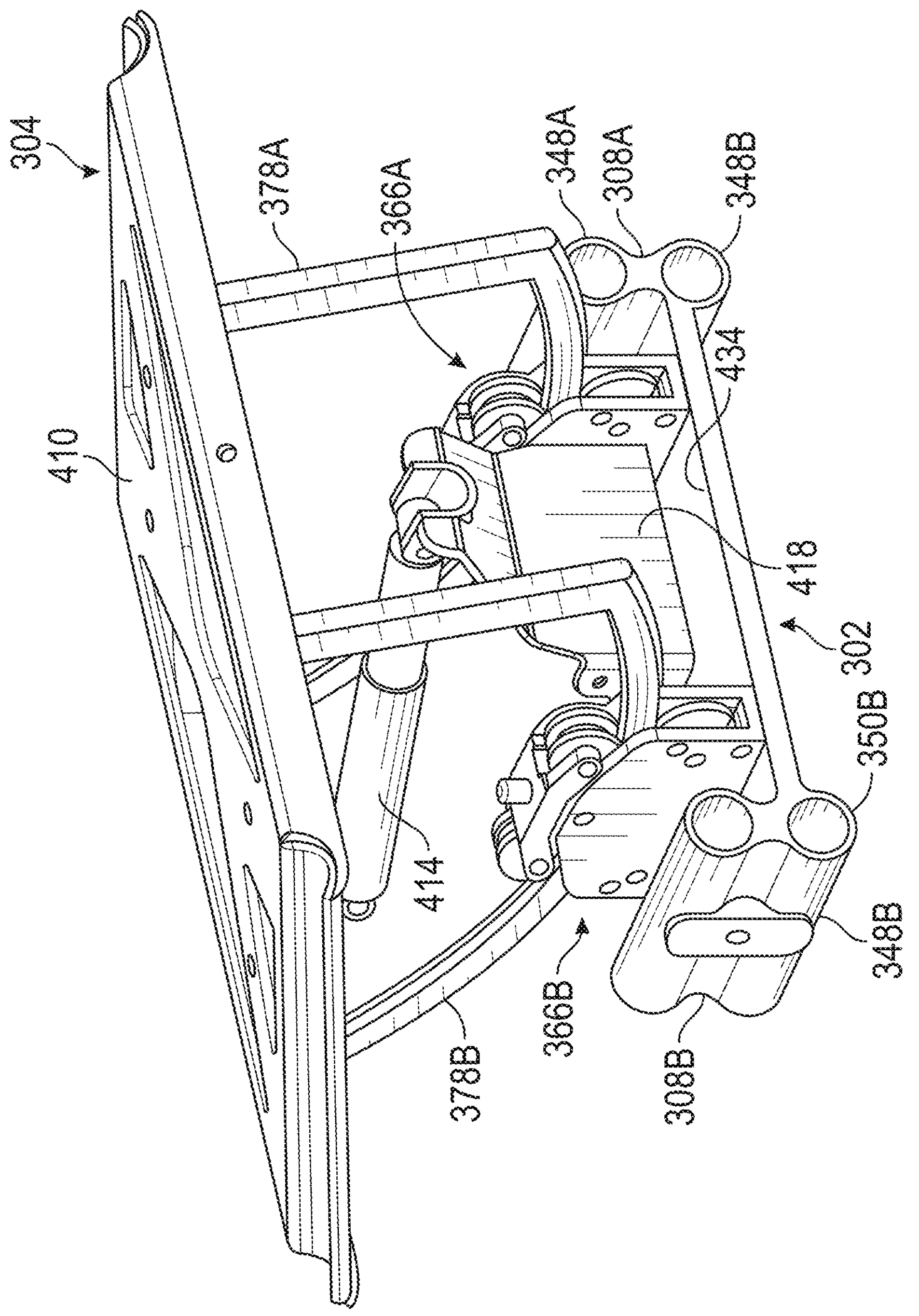
FIG. 17 is a partial elevation view of a base assembly and tilt assembly of a second embodiment of a wheelchair.
Figure 18:
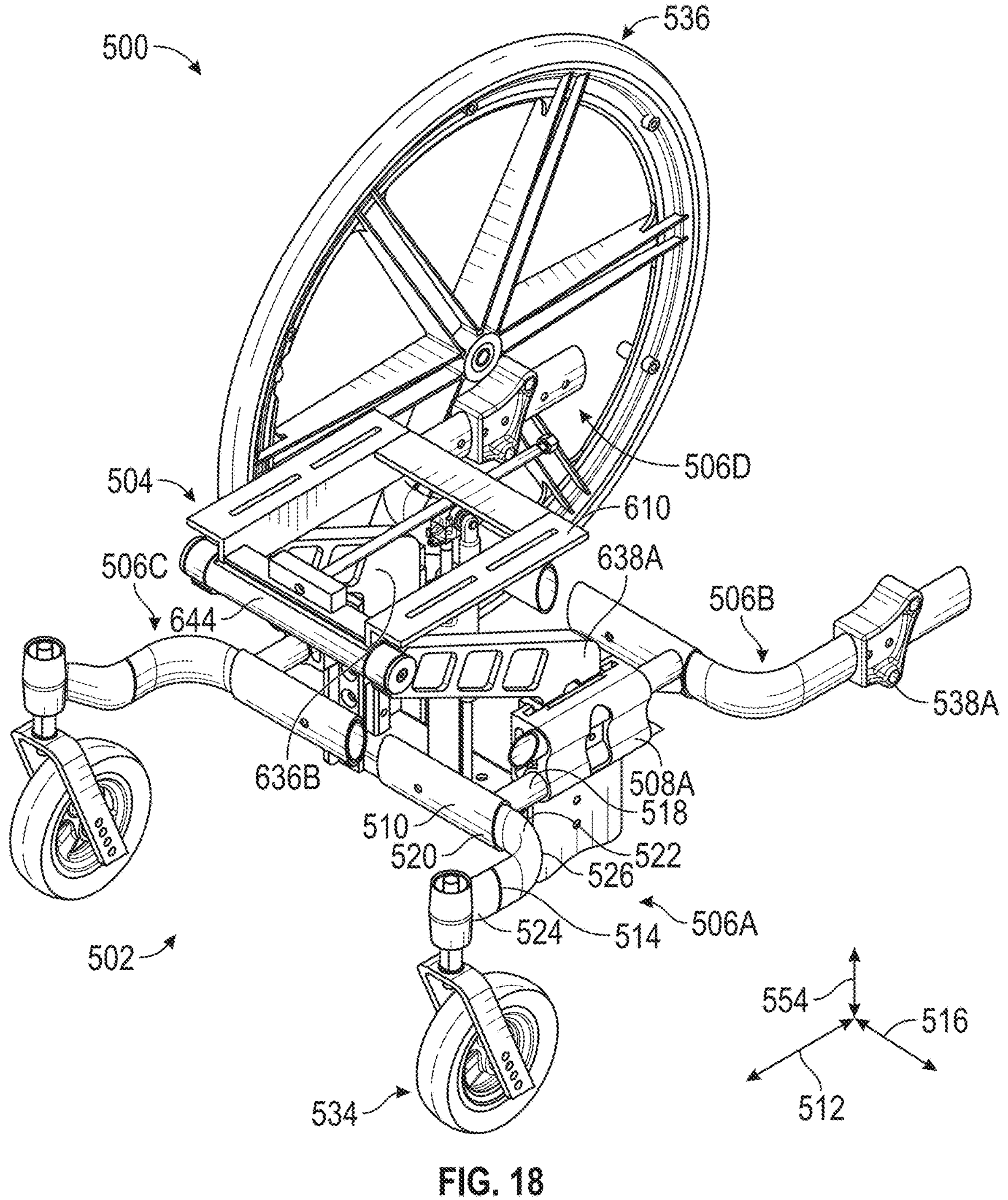
FIG. 18 is a perspective view of a third embodiment of a wheelchair.
Figure 19:
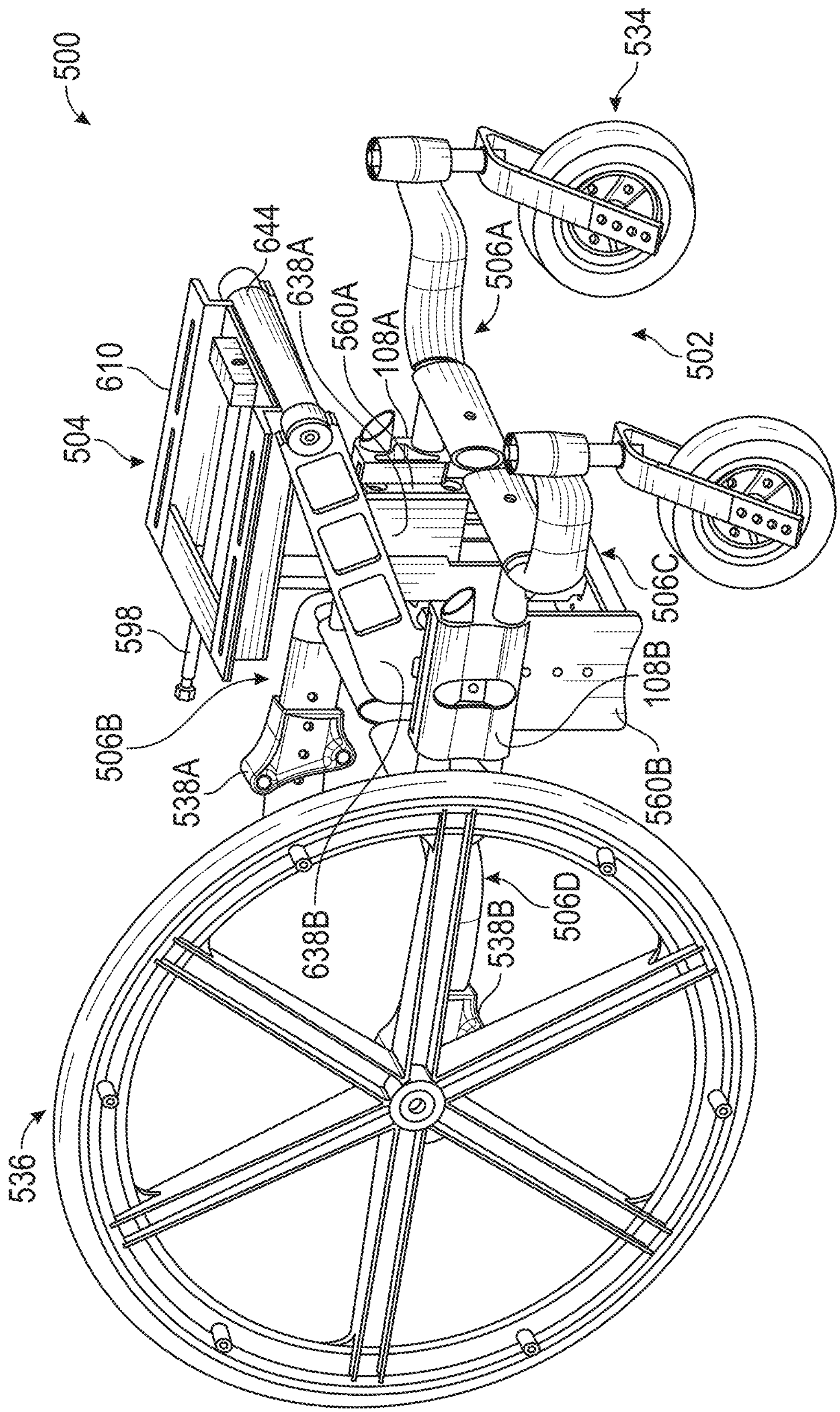
FIG. 19 is another perspective view of the wheelchair of FIG. 18.
Figure 20:
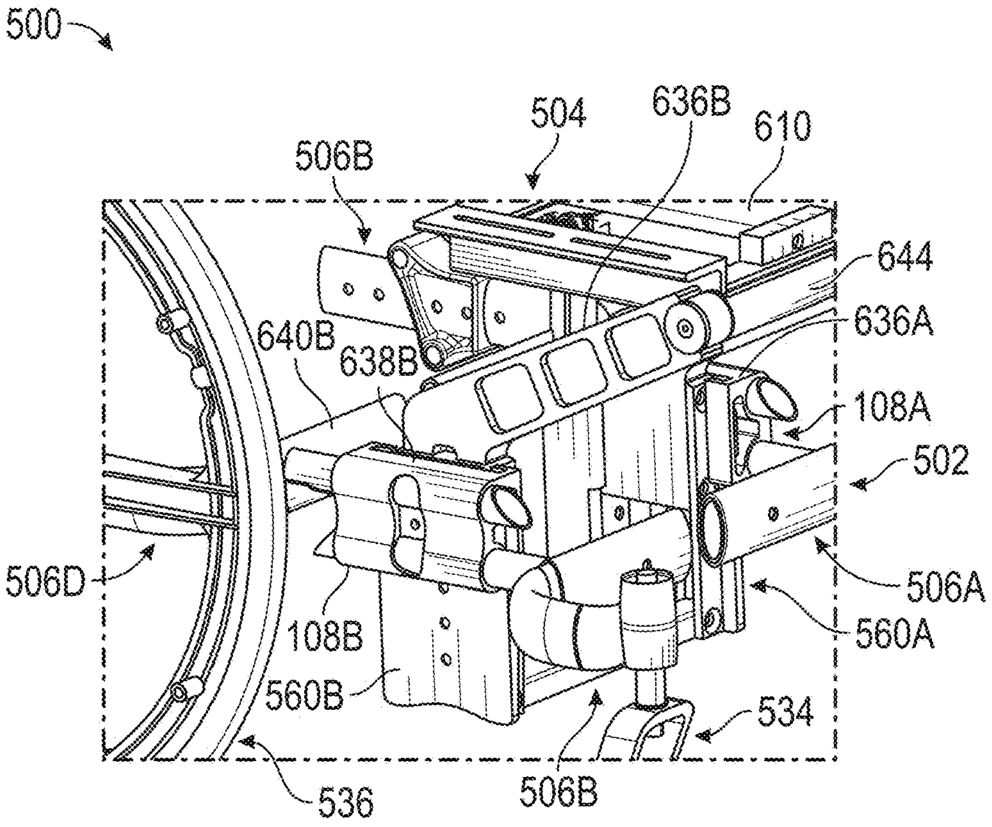
FIG. 20 is an additional perspective view of the wheelchair of FIG. 18 partially showing a base assembly and a tilt assembly.
Figure 21:
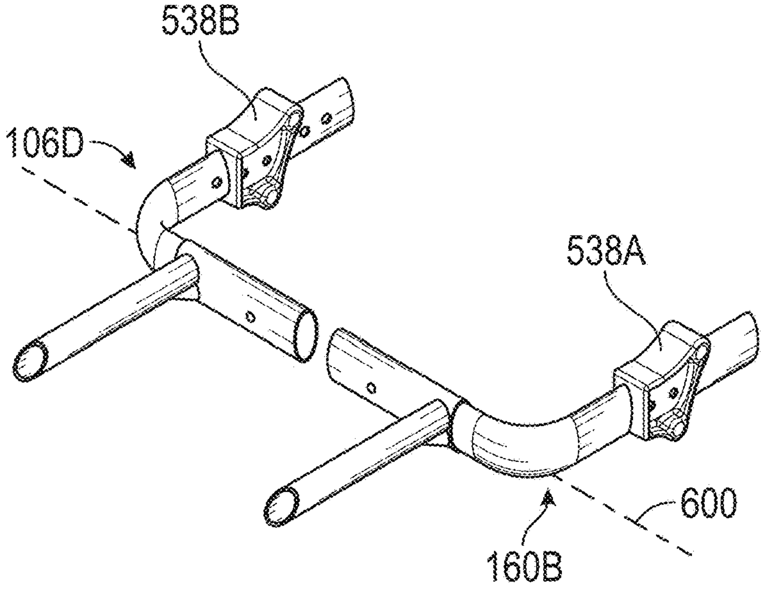
FIG. 21 is a perspective view of arm assemblies of the wheelchair of FIG. 18.

Referring now to FIG. 17, there is illustrated a base assembly, indicated generally at 302, and a tilt assembly, indicated generally at 304, for use with a second embodiment of a wheelchair produced in accordance with the present invention. Because the base assembly 302 and tilt assembly 304 are variations of the base assembly 102 and tilt assembly 104 of FIGS. 1-16, like reference numerals, increased by 200, designate corresponding parts in the drawings and detailed description thereof will be omitted. The tilt assembly 304 includes a seat pan 410, an actuator 414, a rocker plate, similar to rocker plate 216, and a base connection or base plate 418.

In FIG. 17, a connecting portion 434 connects or joins first and second side frames 308A and 308B, respectively. First and second roller assemblies 376A and 376B, respectively, are attached to the connecting portion 434, not first and second side frames 308A and 308B, respectively.

Referring now to FIGS. 18-24, there is illustrated a third embodiment of a wheelchair, indicated generally at 500, produced in accordance with the present invention. Because the wheelchair 500 is a variation of the wheelchair 100 of FIGS. 1-16, like reference numerals, increased by 400, designate corresponding parts in the drawings and detailed description thereof will be omitted.

The wheelchair 500 has a base assembly 502 with first, second, third, and fourth arm assemblies 506A, 506B, 506C, and 506D, respectively. Discussion of one of the first, second, third, and fourth arm assemblies 506A, 506B, 506C, and 506D, respectively, also applies to the others of the first, second, third, and fourth arm assemblies 506A, 506B, 508C, and 506D, respectively, unless otherwise noted. The first and third arm assemblies 506A and 506C, respectively, may be independently adjusted relative to each other in a first direction 512—i.e., the base assembly 502 does not have a front cross member. Similarly, the second and fourth arm assemblies 506B and 506D, respectively, may be independently adjusted relative to each other in the first direction 512—i.e., the base assembly 502 also does not have a rear cross member.

A connecting portion 532 connects or joins first and second side frames 508A and 508B, respectively.

The wheelchair 500 further has first and second slide plate assemblies 566A and 566B, respectively. Discussion of one of the first and second slide plate assemblies 566A and 566B, respectively, also applies to the other of the first and second slide plate assemblies 566A and 566B, respectively, unless otherwise noted. A first pivot bracket mount 636A is attached to the first side frame 508A and a second pivot bracket mount 636B is attached to the second side frame 508B. Discussion of one of the first and second pivot bracket mounts 636A and 636B, respectively, also applies to the other of the first and second pivot bracket mounts 636A and 636B, respectively, unless otherwise noted.

The first pivot bracket mount 636A is restrained in the first direction 512 by first and second stop surfaces 638A and 640A, respectively, on the first side frame assembly 508A. The first pivot bracket mount 636A may be adjusted in a vertical direction 554. The first pivot bracket mount 636A may be adjusted in the vertical direction 554 by removing fasteners (not shown) from holes 642, moving the first pivot bracket mount 636A in the vertical direction 554 relative to the first side frame 508A, and then reinstalling the fasteners to attach the first pivot bracket mount 636A to the first side frame 508A. The fasteners extend through the holes 642 into the first pivot bracket mount 636A and attach the first pivot bracket mount 636A relative to the first side frame 508A in the vertical direction 554.

Mounted to the first and second pivot bracket mounts 636A and 636B, respectively, is a pivot bar 644. The pivot bar 644 rotates on a pivot axis 646. Attached to the pivot bar 644 is a seat pan 610. As a result, the seat pan 610 pivots about the pivot axis 646. The pivot bar 644 is a hinge between the first and second pivot bracket mounts 636A and 636B, respectively, and the seat pan 610.

Figure 22:
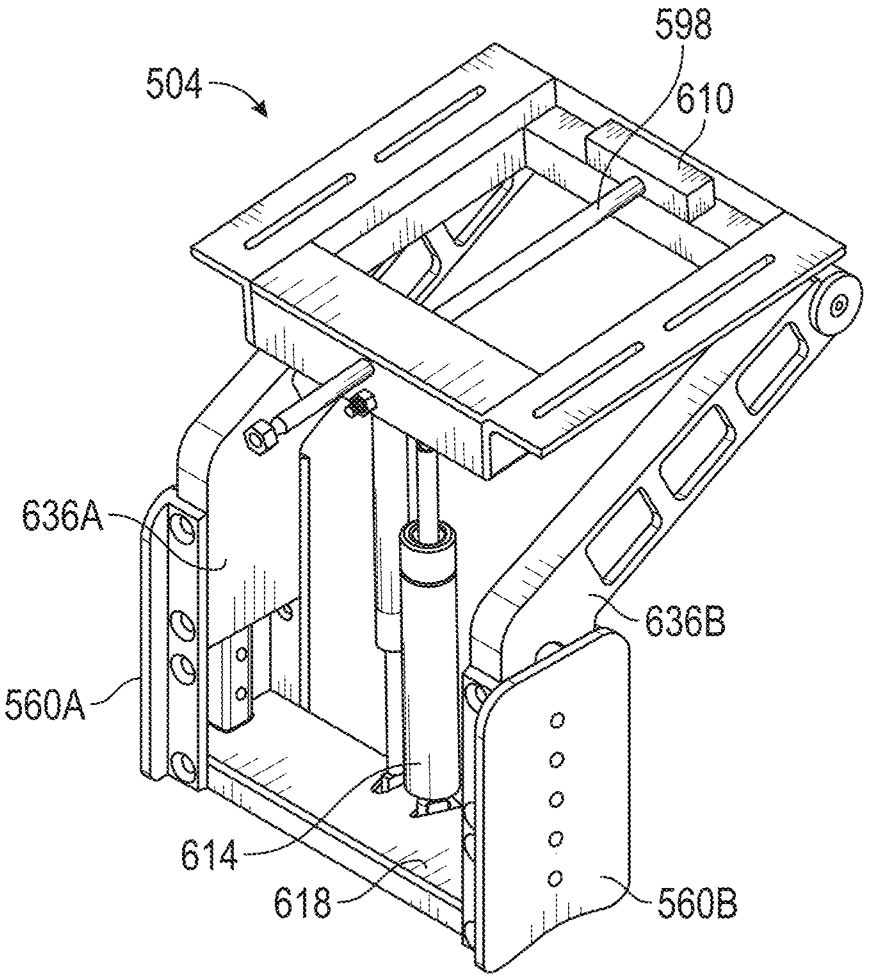
FIG. 22 is a perspective view of the base assembly and tilt assembly of the wheelchair of FIG. 18.
Figure 23:
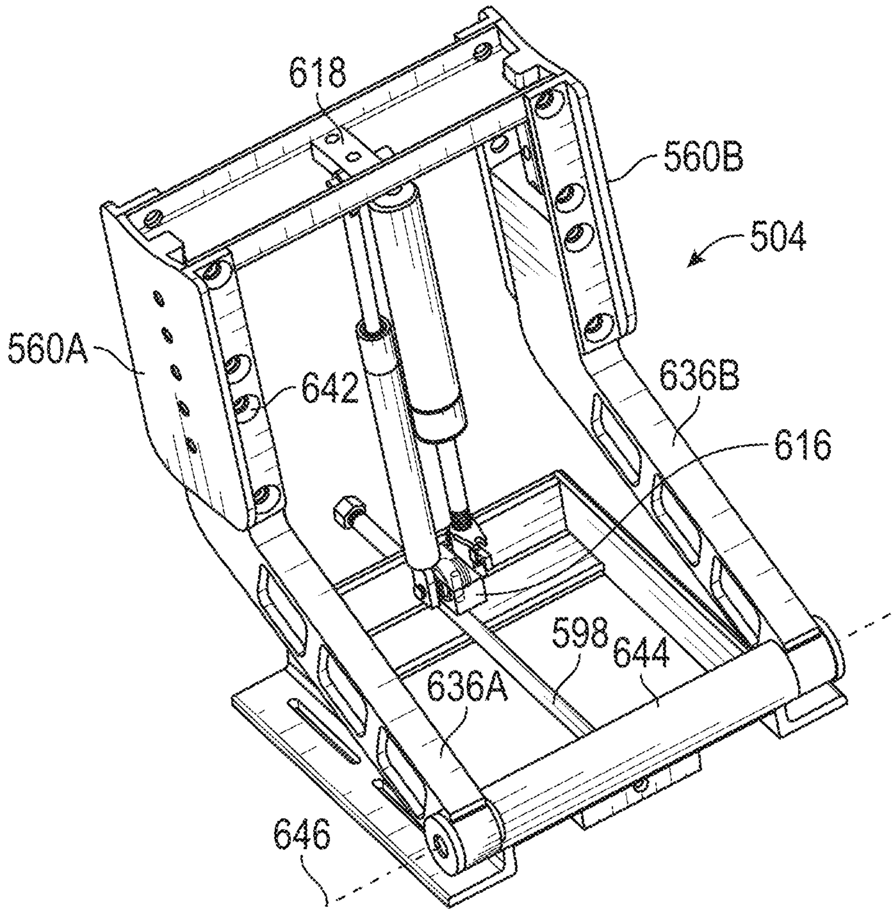
FIG. 23 is an additional perspective view of the base assembly and tilt assembly of the wheelchair of FIG. 18.
Figure 24:
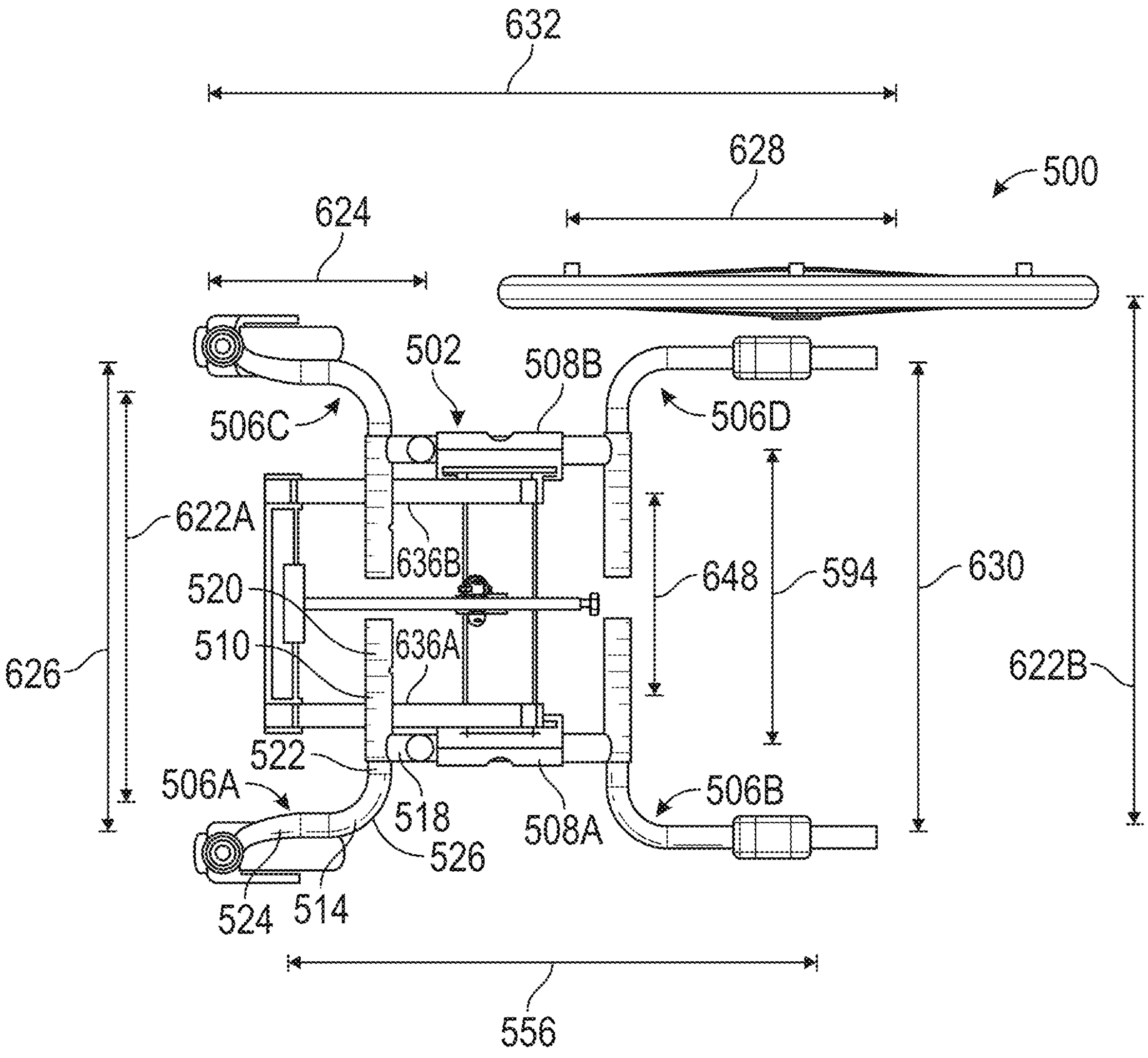
FIG. 24 is a top elevation view of the wheelchair of FIG. 18.

An actuator, illustrated as a selectively releasable gas spring assembly, indicated generally at 614, connects a seat pivot connection 616 and a base pivot connection 618. In FIG. 22, two gas spring assemblies 614 are shown, mounted in opposite orientations, though such is not required. The two gas springs may also be of different load capacities. The seat pivot connection 616 is connected to the seat pan 610. The base pivot connection 618 spans between, and is connected to, the first and second pivot bracket mounts 636A and 636B, respectively. The gas springs 614 are selectively releasable to adjust movement of the tilt assembly 504 relative to the base assembly 502.

A pivot bracket mount spacing 648 between the first and second pivot bracket mounts 636A and 636B, respectively, remains constant when the first, second, third, and fourth arm assemblies 506A, 506B, 506C, and 506D, respectively, are adjusted. As such, the tilt assembly 504 is unchanged when the base assembly 502—i.e., the first, second, third, or fourth arm assemblies 506A, 506B, 506C, or 506D, respectively—is adjusted.

The base assembly of any embodiment—i.e., the base assembly 102 or 502—may be used with the tilt assembly of any other embodiment—i.e., the tilt assembly 104, 304, or 504—and vice versa. As a non-limiting example, the tilt assembly 104 may be installed in the base assembly 102, removed, and then the tilt assembly 306 installed in the base assembly 102 to replace the tilt assembly 104. While the tilt assembly is removed from the base assembly, the wheelbase 156 and front and rear wheel tracks 222A and 222B, respectively, of the base assembly may be maintained in a constant position, if desired.

Figure 25:
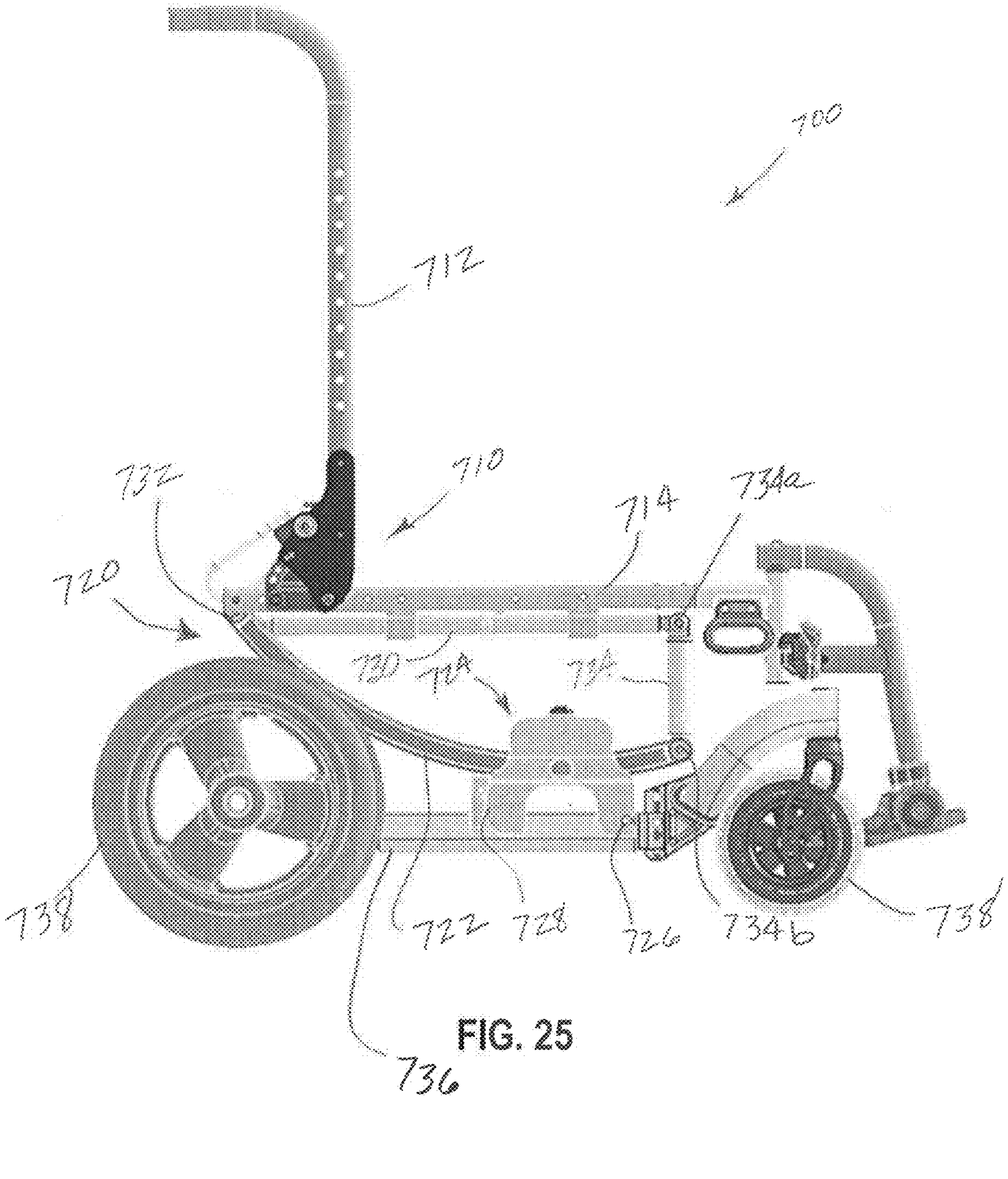
FIG. 25 is an elevational view of a third embodiment of a tilt-in-space wheelchair.
Figure 29B:
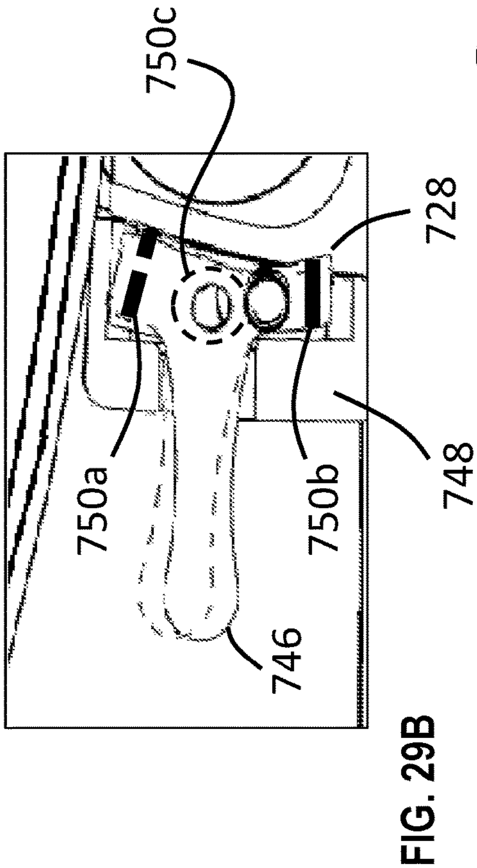
FIG. 29B is an enlarged view of the latch assembly of FIG. 29A.
Figure 29A:
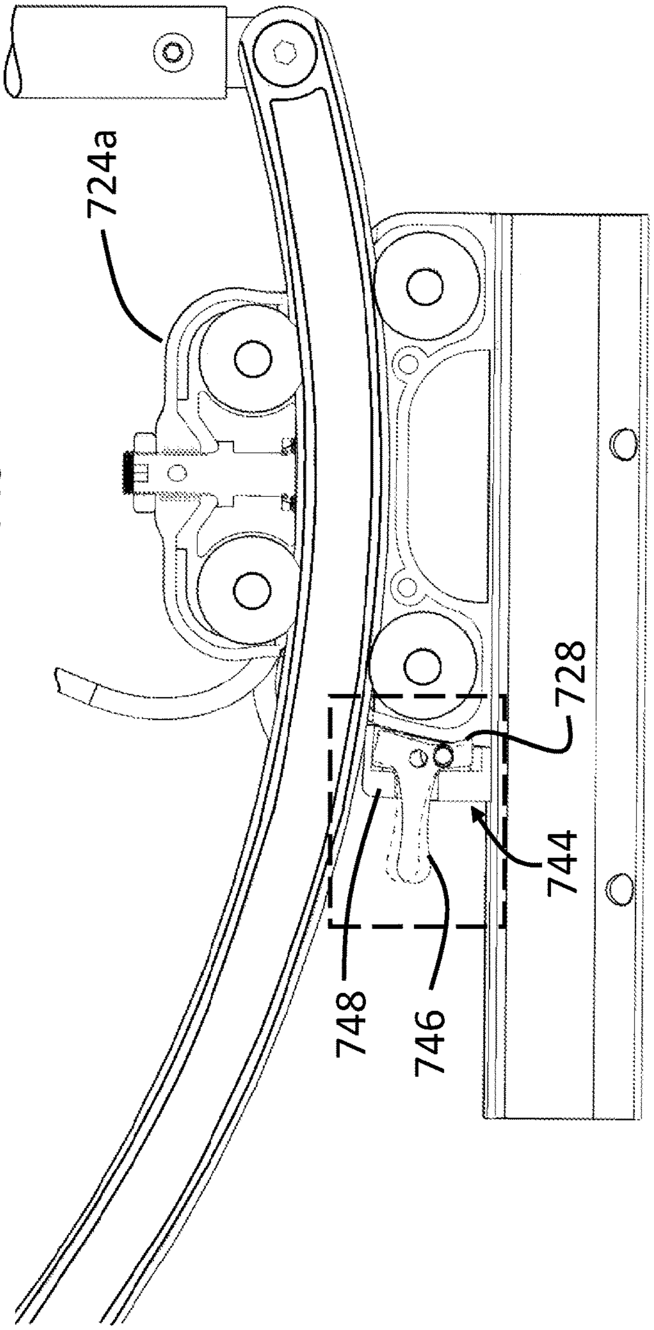
FIG. 29A is an enlarged view, in cross section, of a rocker support assembly and latch assembly of the tilt-in-space wheelchair of FIG. 25.
Figure 30B:
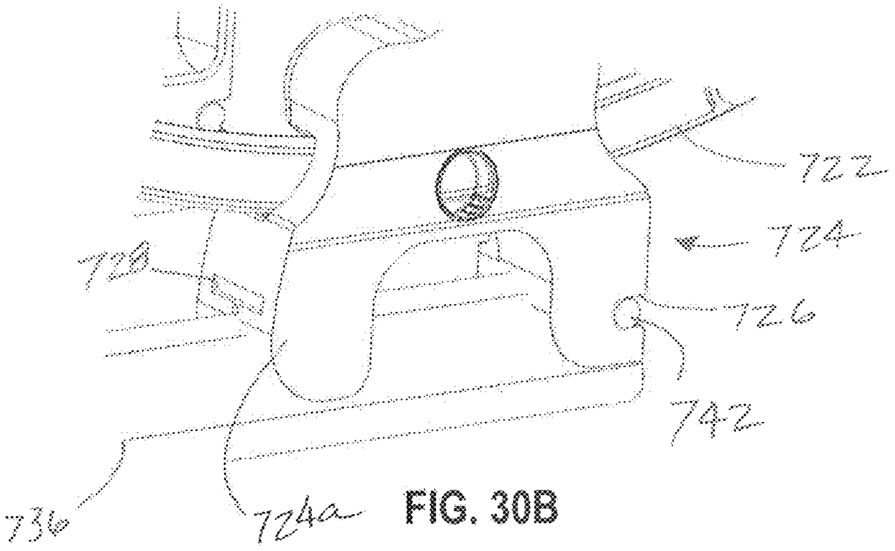
FIG. 30B is a perspective view of the rocker support assembly and housing of FIG. 30A.
Figure 30A:
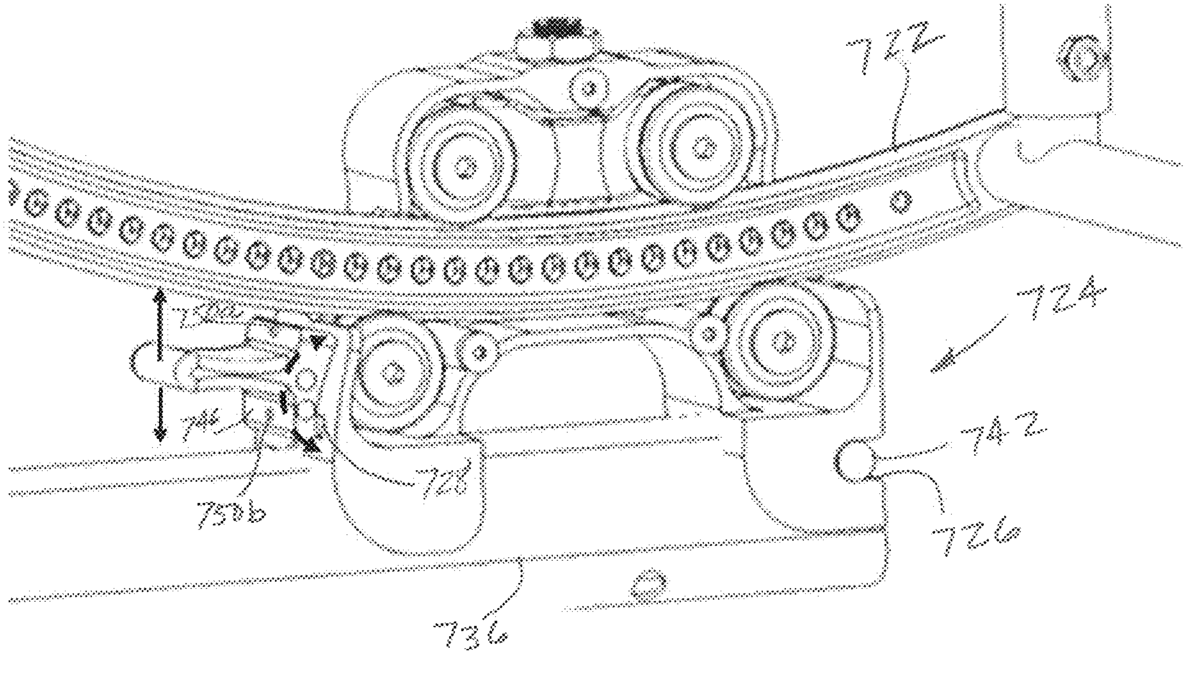
FIG. 30A is a perspective view, in cross section, of the rocker support assembly and latch assembly of FIG. 29A

Referring now to FIG. 25, there is a third embodiment of a tilt-in-space wheelchair shown generally at 700. The wheelchair 700 includes a seat assembly, shown generally at 710 having a backrest frame 712 and a seat frame 714. The illustrated seat assembly 710 is provided for context relative to other portions of the wheelchair and may be configured as any type of seat structure suitable for wheelchair use. The seat assembly 710 is supported on a docking or removeable tilt assembly, shown generally at 720. The tilt assembly 720 includes a rocker 722 that is supported by a rocker guide, shown generally at 724. The rocker guide may be configured to support the rocker 722 for movement similar to the rocker guides shown in FIG. 11 and FIGS. 29A and 30A though other support mechanisms may be used to permit angular movement of the rocker relative to the base. The rocker guide 724 includes a first mounting point 726, shown at a front or proximal end of the rocker guide, and a first latch point 728, configured as one of a latch assembly or a latch receiver at a rear or distal end of the rocker assembly 724. The position of the first mounting point 726 and the first latch point 728 may be reversed if so desired. An upper seat mounting frame 730 is attached at a distal end of the rocker 722. In certain embodiments, the attachment of the upper seat mounting frame 730 to the rocker 722 may be a pivotal attachment 732. A front support 734 extends between a proximal end of the rocker 722 and the upper seat mounting frame 730. In certain embodiments and as will be described below, the front support 734 may be length-adjustable. In embodiments having the adjustable front support 734, connections 734*a* and 734*b* with the upper seat mounting frame 730 and the rocker 722 respectively may be hinged or pivotable. Alternatively, connection points 732, 734*a*, and 734*b* may be fixed.

Figure 26:
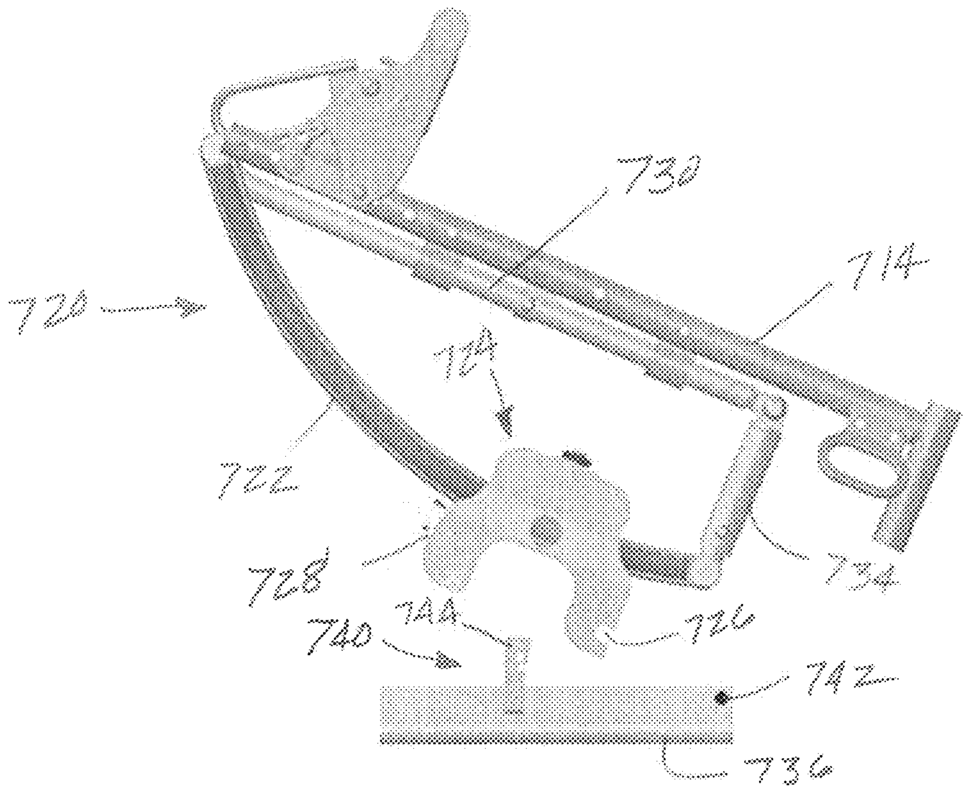
FIG. 26 is an elevational view of a rocker assembly and base portions of the tilt-in-space wheelchair of FIG. 25 shown in an undocked configuration.
Figure 27:
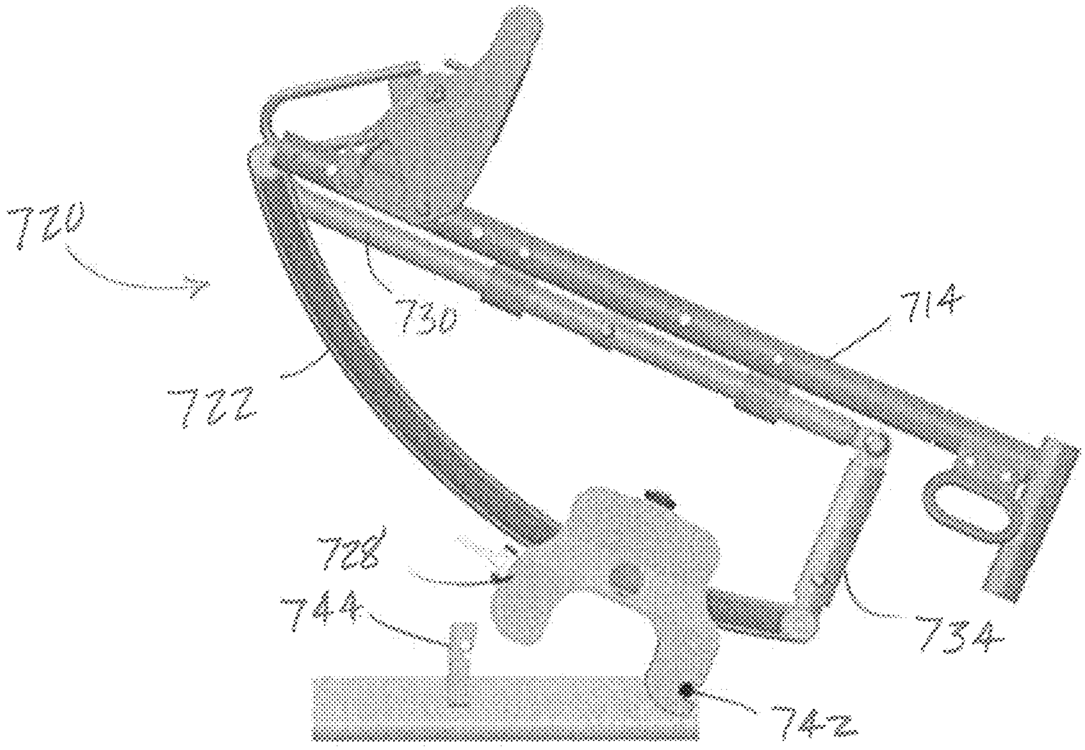
FIG. 27 is an elevational view of the rocker assembly engaging a first mounting point of the base portion of FIG. 26.

A base 736 supports wheels 738 that may be drive wheels, caster wheels, or any other type of wheel arrangement suitable to a wheelchair environment. As shown in FIGS. 26 and 27, the base includes a docking mount shown generally at 740. The docking mount 738 comprises a second mounting point 742 that is configured to engage the first mounting point 726 of the rocker guide 724. The docking mount 738 further comprises a second latch point 744 configured as the mating structure of the one of the latch assembly or the latch receiver of the rocker guide 724. FIG. 26 shows the seat 710 and tilt assembly 720 in an undocked or detached configuration. As shown in FIG. 27, the first mounting point 726 is brought into engagement with the second mounting point 742. In the illustrated embodiment, the first mounting point is configured as a slot or detent and the second mounting point 740 is configured as a pin or axle, though any separable connection that permits the rocker guide to engage a portion of the docking mount may be used.

Figure 28:
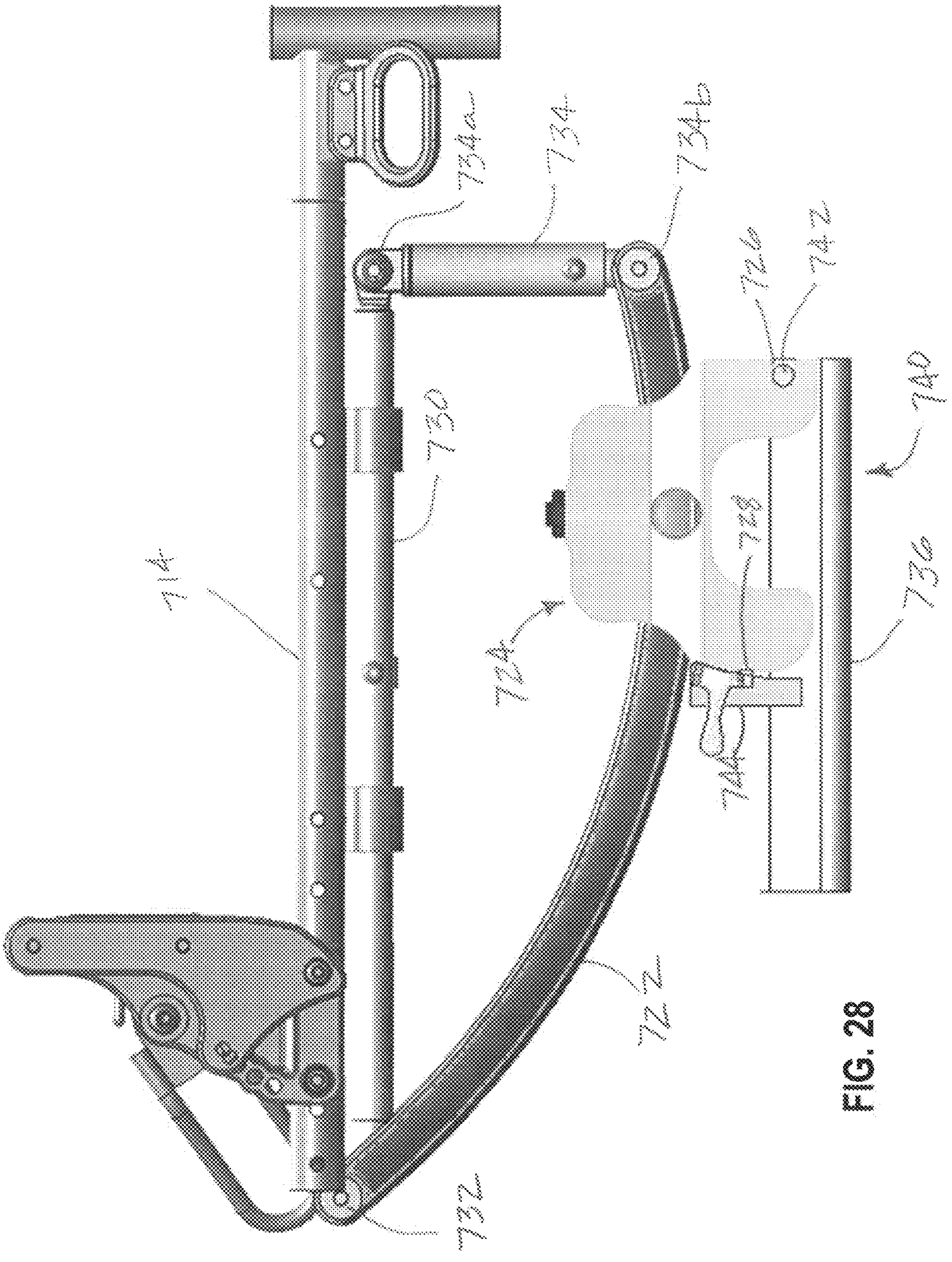
FIG. 28 is an elevational view of the rocker assembly engaging a latching point of the base portion of FIG. 27.

As shown in FIGS. 27 and 28, the first mounting point 726 of the rocker guide 724 is pivoted about the second mounting point 740 until the first latch point 728 and the second latch point 744 are brought into engagement. As shown in FIGS. 29A-30B, the first latch point 728 is configured as a detent formed into a housing 724*a* of the rocker guide 724. The second latch point 744 is a toggle latch 746 pivotally supported by a latch housing 748 of the docking mount 740. The toggle latch 746 may be resiliently biased toward a latched position by, for example, a coil spring or elastomeric bushing 750*c* acting around a toggle latch axis of rotation and connected between the toggle latch 746 and the latch housing 748. In certain embodiments, the toggle latch 746 may include a hold-open magnet 750*a* to keep the latch in an open position to remove the rocker guide from the docking mount. The toggle latch 746 may also include a hold-closed magnet 750*b* that moves the toggle latch to the closed position as the first and second latch points come together. In other embodiments, the toggle latch may be resiliently biased to the closed position and be temporarily held in the unlatch position by the hold-open magnet 750*a*.

Figure 31:
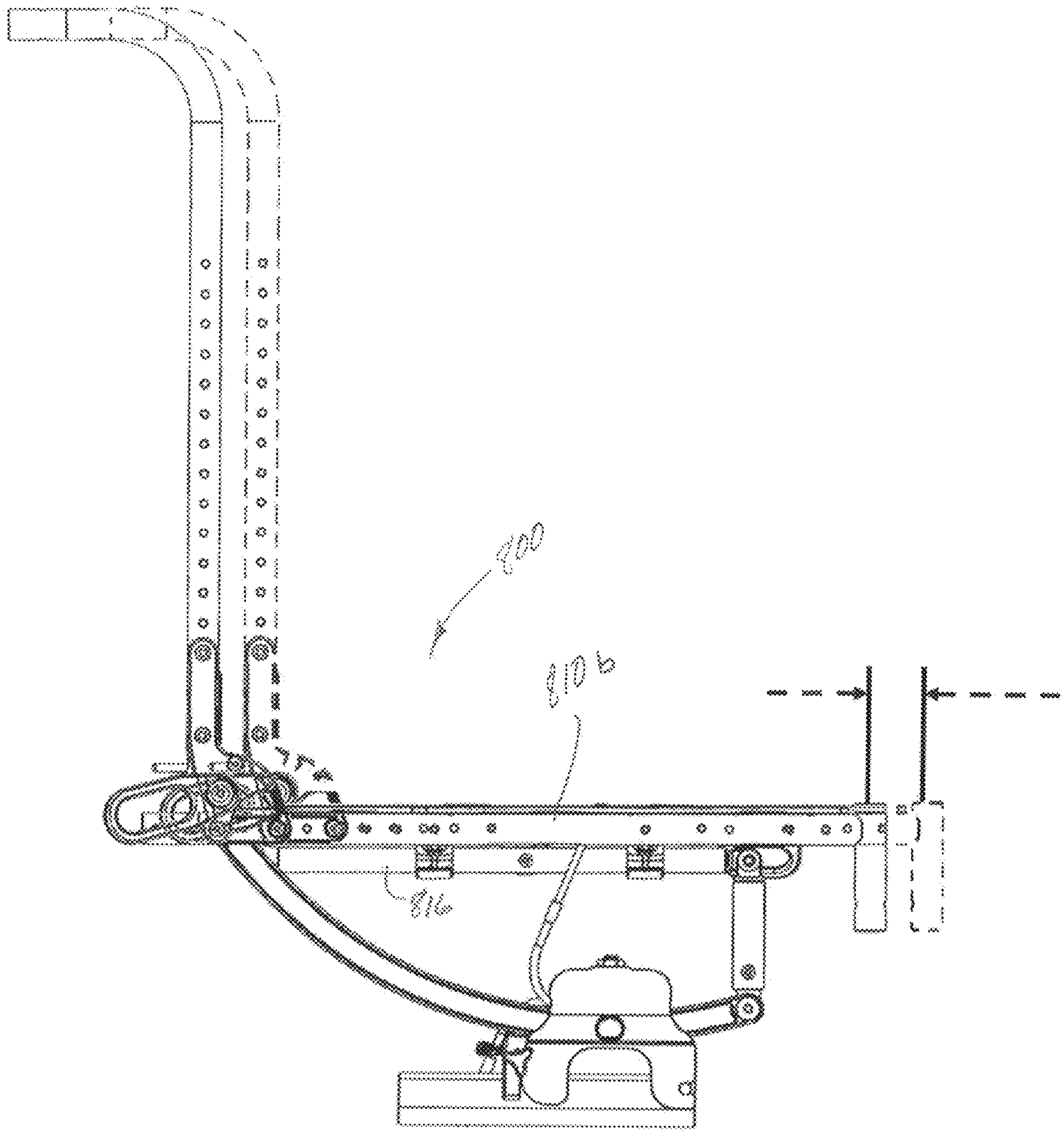
FIG. 31 is an elevational view of an adjusted seat position of the tilt-in-space wheelchair of FIG. 25.
Figure 32:
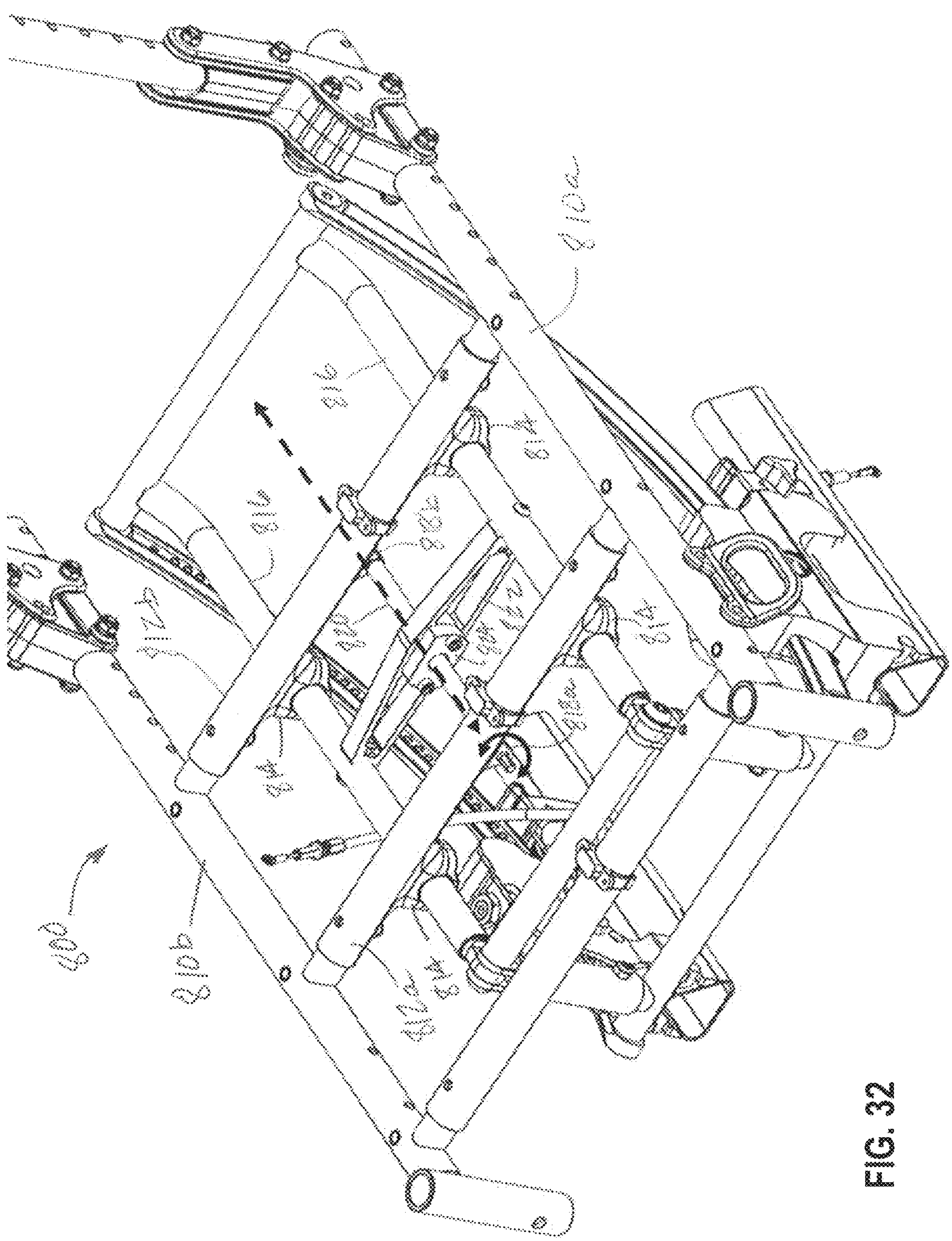
FIG. 32 is a perspective, plan view of a seat frame, rocker assembly and base portion of the wheelchair of FIG. 25 showing a seat position adjustment assembly.

Referring now to FIGS. 31 and 32, a longitudinally adjustable seat frame, shown generally at 800, includes first and second seat frame side rails 810*a* and 810*b* connected together by first and second seat frame cross members 812*a* and 812*b*. The cross members 812*a* and 812*b* may be configured to permit the side rails 810*a* and 810*b* to be mounted at various lateral spacings if so desired. The cross members 812*a* and 812*b* include mounting blocks 814 that clamp around upper seat mounting frames 816, similar to upper seat mounting frame 730 described above. The mounting blocks 814 may be configured as clamps that are lockable to fix the seat frame 800 to the upper seat mounting frames 816 or as bushings configured to slide along portions of the frames 816 yet maintain a close fit to prevent undesired looseness and vibration. The cross members 812*a* and 812*b* include adjuster receivers 818*a* and 818*b* that engage a seat position actuator 820, configured as a screw thread, though the actuator 820 may be an axial actuator—such as a double rod electrically or hydraulically driven actuator if desired. The seat position actuator 820 is supported by an adjustment cross member 822 connected to the upper seat mounting frames 816 of the tilt assembly.

The adjustment cross member 822 includes an actuator block 824 that threads onto the seat position actuator 820 when configured as a screw thread. Alternatively, the actuator block 824 may be a clamp that holds an actuator housing (not shown) of an electrically or hydraulically driven actuator. In the screw thread actuator embodiment, the adjuster receivers 818*a* and 818*b* axially retain the ends of the actuator 820 relative to the cross members 812*a* and 812*b*. As the seat position actuator 820 is rotated in the adjuster receivers 818*a* and 818*b*, the screw thread rotates within the actuator block 824 which is configured as a threaded nut structure. Rotation of the screw actuator 820 in one direction causes forward movement of the seat 800 relative to the upper seat mounting frames 816 and rotation in the other direction causes rearward movement of the seat frame 800. The actuator 820 may be either manually driven or power driven.

Figure 33A:
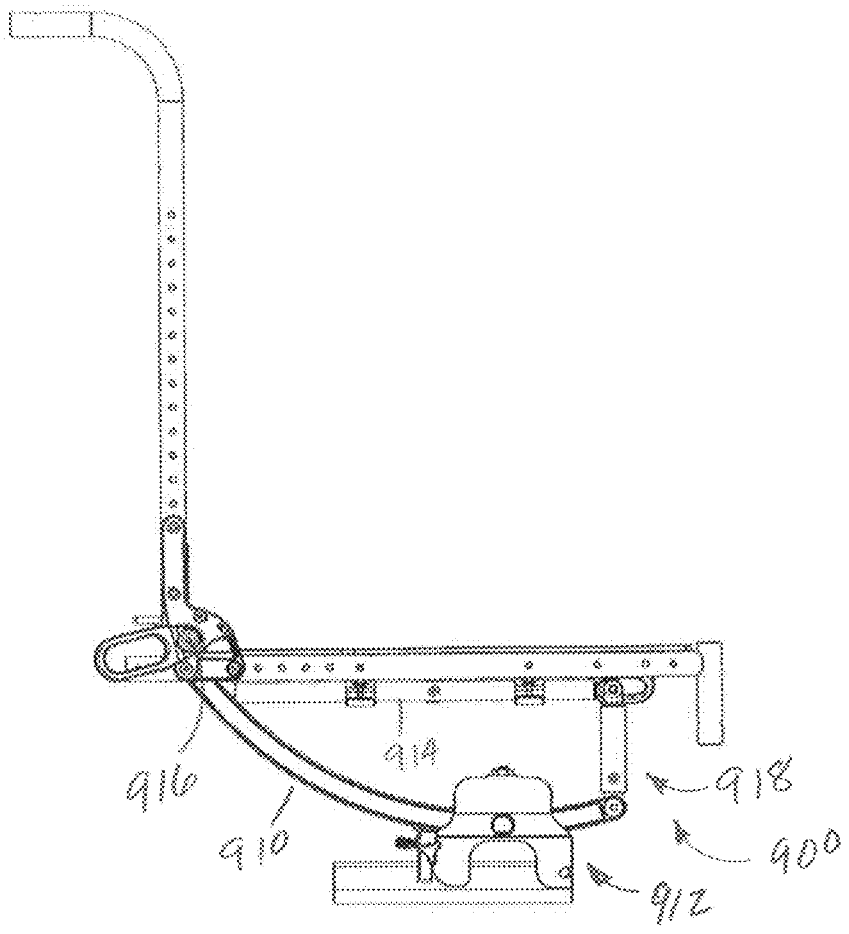
FIG. 33A is an elevational view of the tilt-in-space wheelchair of FIG. 25 shown in a first seat angle position relative to the rocker supports.
Figure 33B:
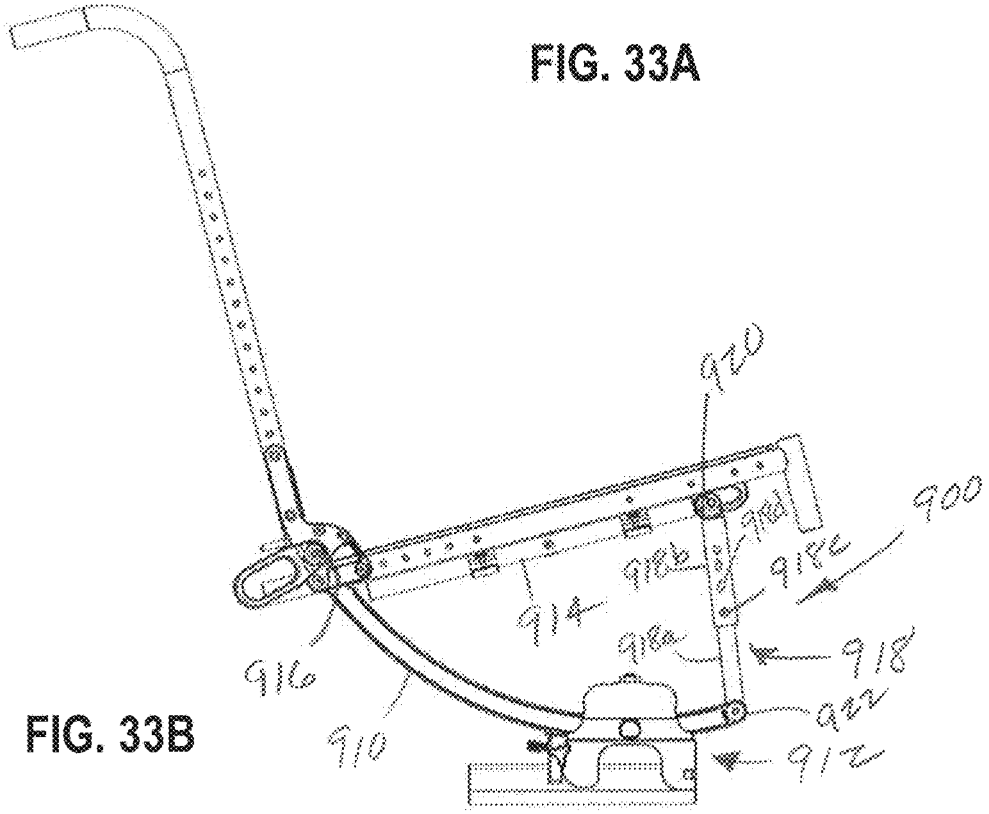
FIG. 33B is an elevational view of the tilt-in-space wheelchair of FIG. 33A shown in a second seat angle position relative to the rocker supports.

Referring now to FIGS. 33A and 33B, there is illustrated an inclinable tilt assembly, shown generally at 900. It should be understood that only one side of the inclinable tilt assembly is illustrated and a second, spaced apart tilt assembly is utilized in the wheelchair of the invention establishing left and right sides. The inclinable tilt assembly 900 may be used in conjunction with the longitudinally adjustable seat frame and/or the docking tilt assembly 720, if so desired. The inclinable tilt assembly 900 includes a rocker 910 that is supported by a rocker guide 912. The rocker 910 is pivotally connected to an upper seat mounting frame 914 at a first pivot connection 916. An adjustable front support 918 is configured as telescoping support tubes 918*a* and 918*b* that are fixed by a connection point 918*c*, such as a fastener or resilient button. One of the support tubes 918*a* or 918*b* may include a plurality of adjustment apertures 918*d* to permit different length configurations of the adjustable front support 918. Alternatively, the adjustable front support may be a power driven actuator. The adjustable front support 918 is pivotally connected to the upper seat mounting frame 914 at a second pivot connection 920 and pivotally connected to the rocker at a third pivot connection 922. As the adjustable front support 918 is extended, as shown in FIG. 33B, the pivot connections permit the seat to be inclined without affecting the orientation or position of the rocker 910 relative to the rocker guide 912.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A wheelchair comprising:

a base having a plurality of support wheels;

a tilt assembly configured to support a seating system, the tilt assembly including a rocker providing an incremental angular adjustment of the seating system relative to the base and a rocker guide supporting the rocker for relative movement, the rocker guide having a first mounting point and a latch receiver configured as a detent; and a docking mount attached to the base, the docking mount defining a second mounting point that engages the first mounting point, and a latch configured as a toggle latch including one of a hold-open magnet or a resilient member adapted to resiliently bias the toggle latch toward a latched position, the toggle latch cooperating with the latch receiver of the rocker guide to releasably mount the rocker guide to the base.

2. The wheelchair of claim 1 wherein the first mounting point is configured as a slot, the second mounting point is configured as a pin.

3. The wheelchair of claim 1 wherein the tilt assembly includes an upper seat mounting frame configured to support the seating system and a seat adjuster having an actuator configured to longitudinally adjust the seating system relative to the upper seat mounting frame.

4. The wheelchair of claim 3 wherein the seating system includes a frame and at least one cross member that slidably engages the upper seat mounting frame, the upper seat mounting frame includes an actuator block that engages the actuator such that movement of the actuator causes the longitudinal adjustment of the seating system.

5. The wheelchair of claim 1 wherein the rocker is pivotally connected to an upper seat mounting frame configured to support the seating system and a seat inclination adjuster is pivotally connected between the upper seat mounting frame and the rocker such that extending or retracting the seat inclination adjuster increases or decreases the angle of the seating system relative to the rocker.

6. The wheelchair of claim 5 wherein the seat inclination adjuster is configured as telescoping tubular sections.

7. A wheelchair comprising:

a seat;

a base; and a tilt assembly having a rocker guide attached to the base and configured to permit movement of the tilt assembly relative to the base, the rocker guide defines a first mounting point and a latch receiver configured as a detent, and the base defines a second mounting point that engages the first mounting point and the base supports a toggle latch including a hold-open magnet configured to retain the toggle latch into an unlatched position, the toggle latch configured to cooperate with the latch receiver of the rocker guide to releasably mount the rocker guide to the base, the tilt assembly including a rocker supported by the rocker guide.

8. The wheelchair of claim 7 wherein the rocker guide supports an upper seat mounting frame configured to support the seat, the upper seat mounting frame supporting a seat adjuster having an actuator configured to longitudinally adjust the seat relative to the upper seat mounting frame.

9. The wheelchair of claim 8 wherein the upper seat mounting frame supports an actuator block, the actuator is a screw thread that engages the actuator block having a mating thread, the seat including a seat frame that is connected to the actuator such that rotation of the screw thread causes the longitudinal seat adjustment in one of a forward or a rearward direction.

10. The wheelchair of claim 9 wherein the actuator block is mounted on a cross member supported by spaced-apart upper seat mounting frames, the seat frame includes mounting blocks configured to slide along portions of the upper seat frames in response to movement of the actuator.

11. The wheelchair of claim 8 wherein the actuator is one of a power driven screw thread or an electric linear motion actuator.

12. The wheelchair of claim 8 wherein the rocker is pivotally connected to the upper seat mounting frame, and a seat inclination adjuster is pivotally connected between the upper seat mounting frame and the rocker such that extending or retracting the seat inclination adjuster increases or decreases the angle of the seating system relative to the rocker.

13. The wheelchair of claim 7 wherein the toggle latch further includes a hold-closed magnet that moves or retains the toggle latch in a closed or locked position.

14. A wheelchair comprising:

a seat;

a base; and a tilt assembly having a rocker guide attached to the base and configured to permit movement of the tilt assembly relative to the base, the rocker guide defines a first mounting point and a latch receiver configured as a detent, and the base defines a second mounting point that engages the first mounting point and the base supports a toggle latch including a hold-open magnet configured to retain the toggle latch toward an unlatched position and a resilient member adapted to bias the toggle latch toward a latched position, the toggle latch configured to cooperate with the latch receiver of the rocker guide to releasably mount the rocker guide to the base, the tilt assembly including a rocker supported by the rocker guide.

15. The wheelchair of claim 14 wherein the rocker is pivotally connected to an upper seat mounting frame configured to support the seat, a seat inclination adjuster is pivotally connected between the upper seat mounting frame and the rocker such that extending or retracting the seat inclination adjuster increases or decreases the angle of the seat relative to the rocker.

16. The wheelchair of claim 15 wherein the seat inclination adjuster is configured as telescoping tubes having a plurality of adjustment apertures.

17. The wheelchair of claim 15 wherein the seat inclination adjuster is a power actuated linear motion actuator.

18. The wheelchair of claim 14 wherein the tilt assembly includes a seat adjuster having an actuator configured to longitudinally adjust the seat relative to the upper seat mounting frame.

* * * * *